US006437874B1

(12) United States Patent
Shibaki et al.

(10) Patent No.: US 6,437,874 B1
(45) Date of Patent: Aug. 20, 2002

(54) IMAGE FORMING APPARATUS FOR DETECTING FULL OF FILE BUFFER

(75) Inventors: Masako Shibaki, Yokohama; Toshiharu Takahashi; Miki Hamanaka, both of Kawasaki, all of (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/528,240

(22) Filed: Mar. 16, 2000

Related U.S. Application Data

(60) Continuation of application No. 08/992,452, filed on Dec. 17, 1997, now Pat. No. 6,052,201, which is a division of application No. 08/573,953, filed on Dec. 19, 1995, now Pat. No. 5,724,490.

(30) Foreign Application Priority Data

Jan. 31, 1995 (JP) .............................................. 7-014494

(51) Int. Cl.[7] .............................................. G06K 15/00
(52) U.S. Cl. ..................................... 358/1.15; 358/1.16
(58) Field of Search .............................. 358/1.14, 1.15, 358/1.16, 404, 401, 443, 444, 450, 452

(56) References Cited

U.S. PATENT DOCUMENTS 4,935,786 A * 6/1990 Veeder ........................ 355/319
5,220,438 A * 6/1993 Yamamoto ................... 358/404
5,363,206 A * 11/1994 Fukushima .................. 358/440
5,724,490 A * 3/1998 Shibaki et al. ............... 395/114
6,052,201 A * 4/2000 Shibaki et al. .............. 358/1.16

FOREIGN PATENT DOCUMENTS

| JP | 63-62466 | 3/1988 |
| JP | 4-117065 | 4/1992 |
| JP | 5-167868 | 7/1993 |

* cited by examiner

Primary Examiner—Jerome Grant, II
(74) Attorney, Agent, or Firm—Gray Cary Ware & Freidenrich LLP

(57) ABSTRACT

An image forming apparatus includes a scanner for reading image information of an original, a memory for storing the image information of a plurality of originals read by the scanner, a printer for forming the image information of at least two of the originals stored in the memory on a single image formation medium, a detector for detecting that the memory becomes full, and a controller. When the detector detects that the memory becomes full while the scanner is performing a series of read operations, the controller controls the printer to print images of the image information of originals which are stored in the memory and images of which are to be formed on a single sheet, erases the image information whose images are printed, and controls the scanner to restart reading of the originals.

3 Claims, 26 Drawing Sheets

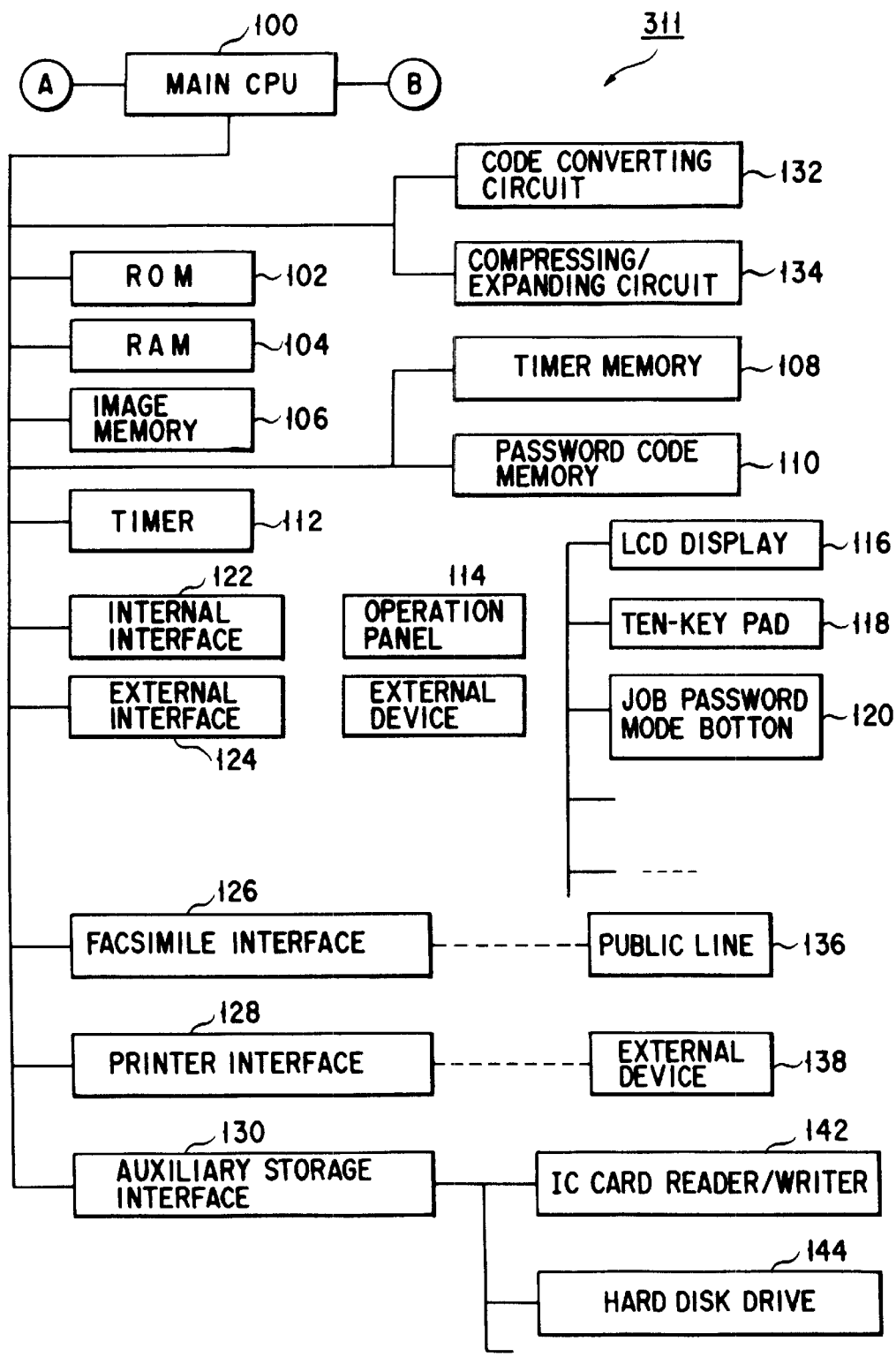
F I G. 4

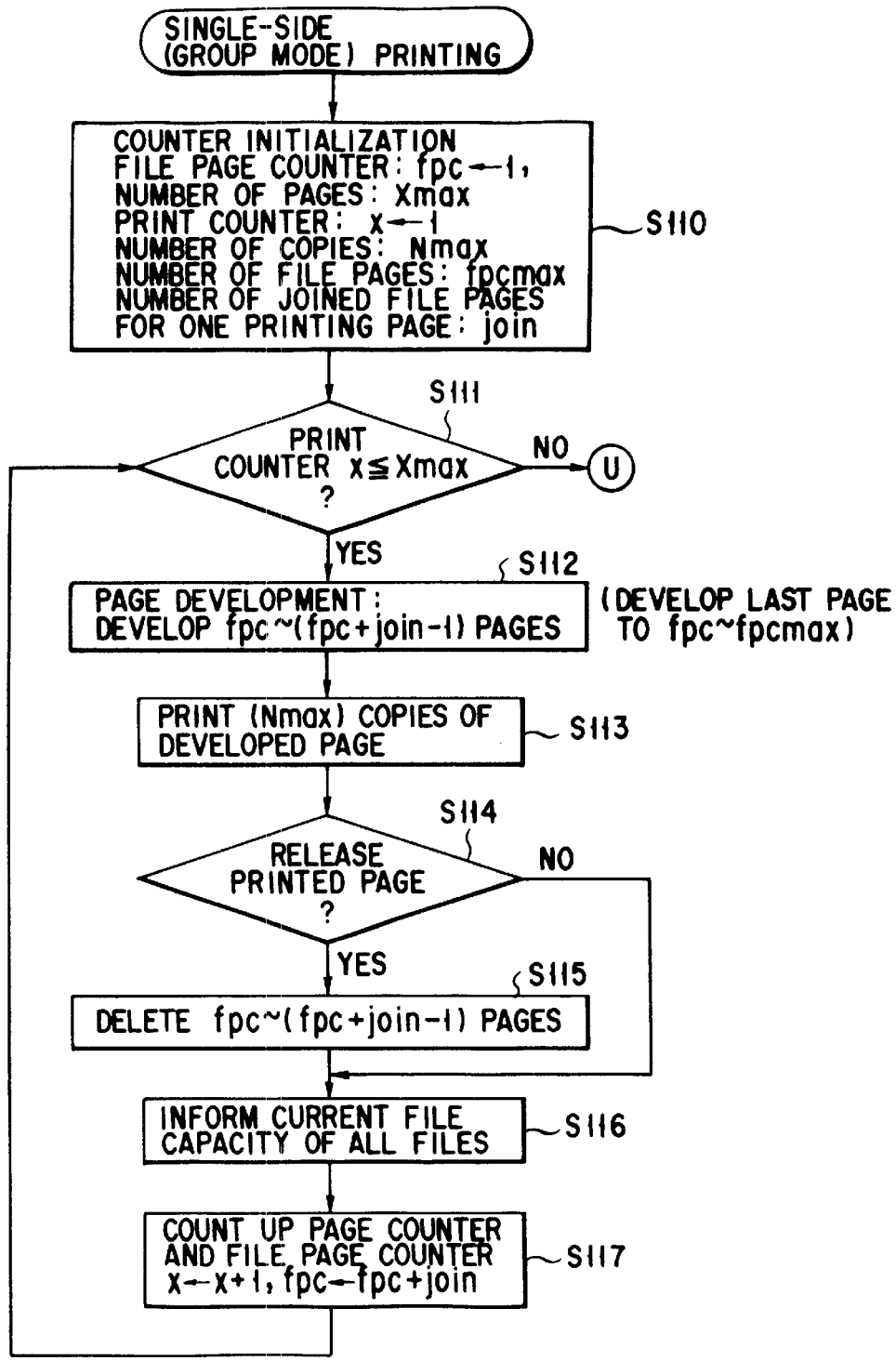
F I G. 19

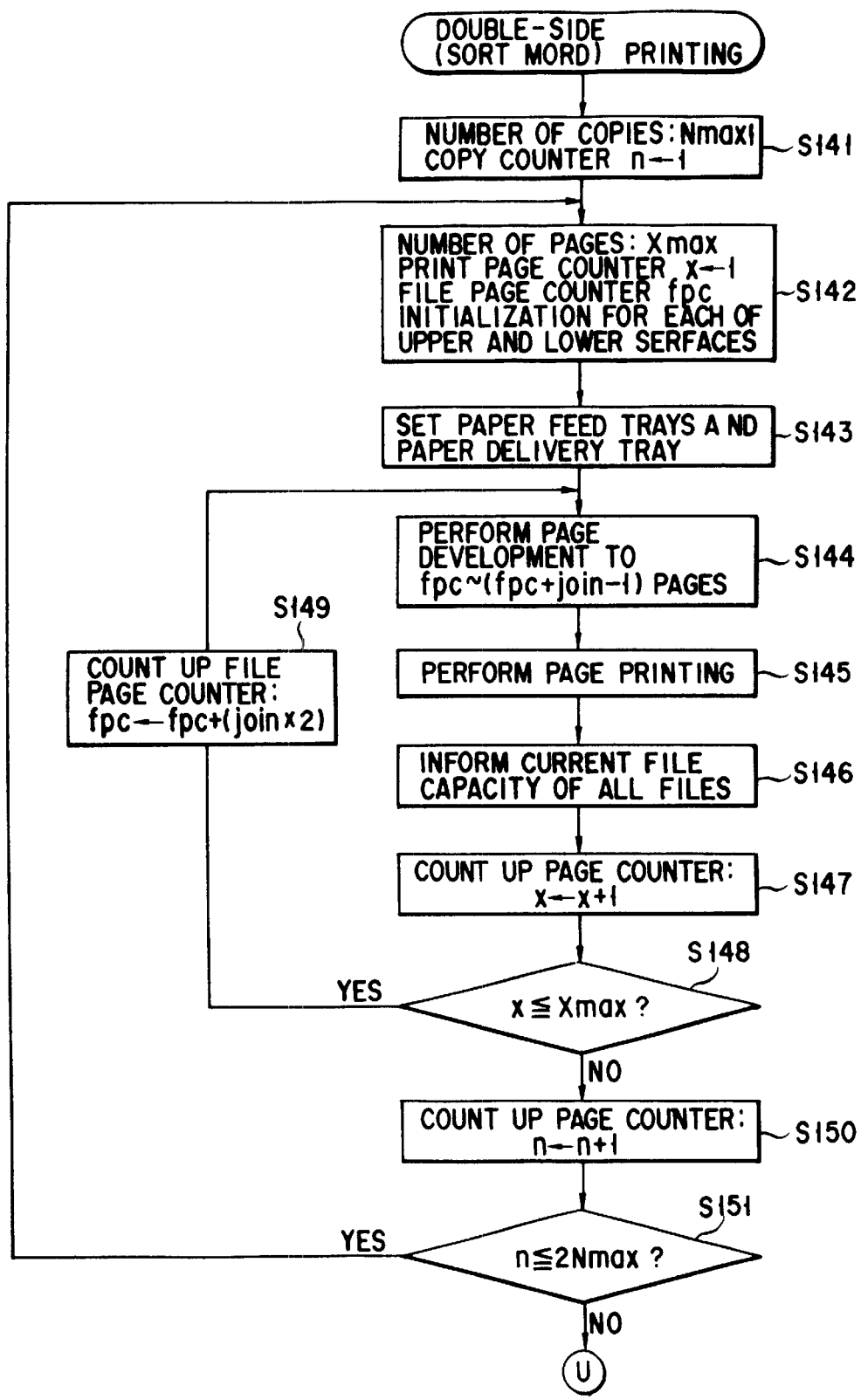
F I G. 22

IMAGE FORMING APPARATUS FOR DETECTING FULL OF FILE BUFFER

This is a continuation of application Ser. No. 08/992,452 filed Dec. 7, 1997 now U.S. Pat. No. 6,052,201, which is a divisional of application Ser. No. 08/573,953 filed Dec. 19, 1995, now U.S. Pat. No. 5,724,490.

BACKGROUND OF THE INVENTION

1. Field of the Invention

The present invention relates to a digital image input/output apparatus or a digital copying machine with an image compressing/expanding means and an image storage means.

2. Description of the Related Art

In conventional digital copying machines, input original image information from a scanner is temporarily held in a page buffer. Whenever an original is input from the scanner, the image information is compressed, and the compressed image information of a plurality of originals is stored in a file buffer.

These conventional digital copying machines have a so-called electronic sort function by which the compressed image information stored in the file buffer is subjected to single-side or double-side printing in a sort mode or a group mode by appropriately changing the output order of the image information.

When a large quantity of originals are to be copied, for example, the file buffer sometimes becomes full while the originals are being input from the scanner. If this is the case, a series of original input operations are interrupted, and the copied products of originals that are input up to this point are output, thereby completing a single job.

If the number of originals is large, therefore, it is necessary to output the copied products before the remaining originals can be input, resulting in a cumbersome operation.

Also, a plurality of originals are joined and output in the form of a single copy in some instances such as in double-side printing. If the file buffer is filled up after an original for one side is input, the other side of a copy to be subjected to double-side printing remains blank. The result is that the copying operation cannot be well completed.

SUMMARY OF THE INVENTION

It is an object of the present invention to provide a composite image forming apparatus capable of accurately performing a copying operation in a copying machine which compresses and stores a plurality of originals, even if a memory for storing the compressed information becomes full.

The present invention is an image forming apparatus comprising means for reading image information of an original, means for storing the image information of a plurality of originals read by the reading means, means for performing image formation such that the image information of at least two of the originals stored in the storing means is formed on a single image formation medium, means for detecting that the storing means becomes full, and means for, when the detecting means detects that the storing means becomes full while the reading means is performing a series of read operations, controlling the image forming means to form images of the image information of the originals which are stored in the storing means and images of which are to be formed on a single image formation medium, erasing the image information whose images are thus formed, and controlling the storing means to store the image information read by the reading means.

According to the present invention with the above arrangement, when the storing means, such as a file buffer, becomes full while the image information of a plurality of input originals is being compressed and stored in the storing means, the image information already stored is printed on a sheet as an image formation medium, and the printed image information is erased from the storing means. Consequently, an empty area is formed in the storing means, so the image information of the rest of originals can be read and stored.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram showing the arrangement of a main CPU;

FIG. 19 is a flow chart for explaining single-side printing (group mode);

FIG. 22 is a flow chart for explaining double-side printing (sort mode);

DETAILED DESCRIPTION OF THE PREFERRED EMBODIMENTS

An embodiment of a composite image forming apparatus according to the present invention which has three functions, i.e., a copying (PPC) function, a facsimile (FAX) function, and a printer (PRT) function, will be described below.

Figure 1:
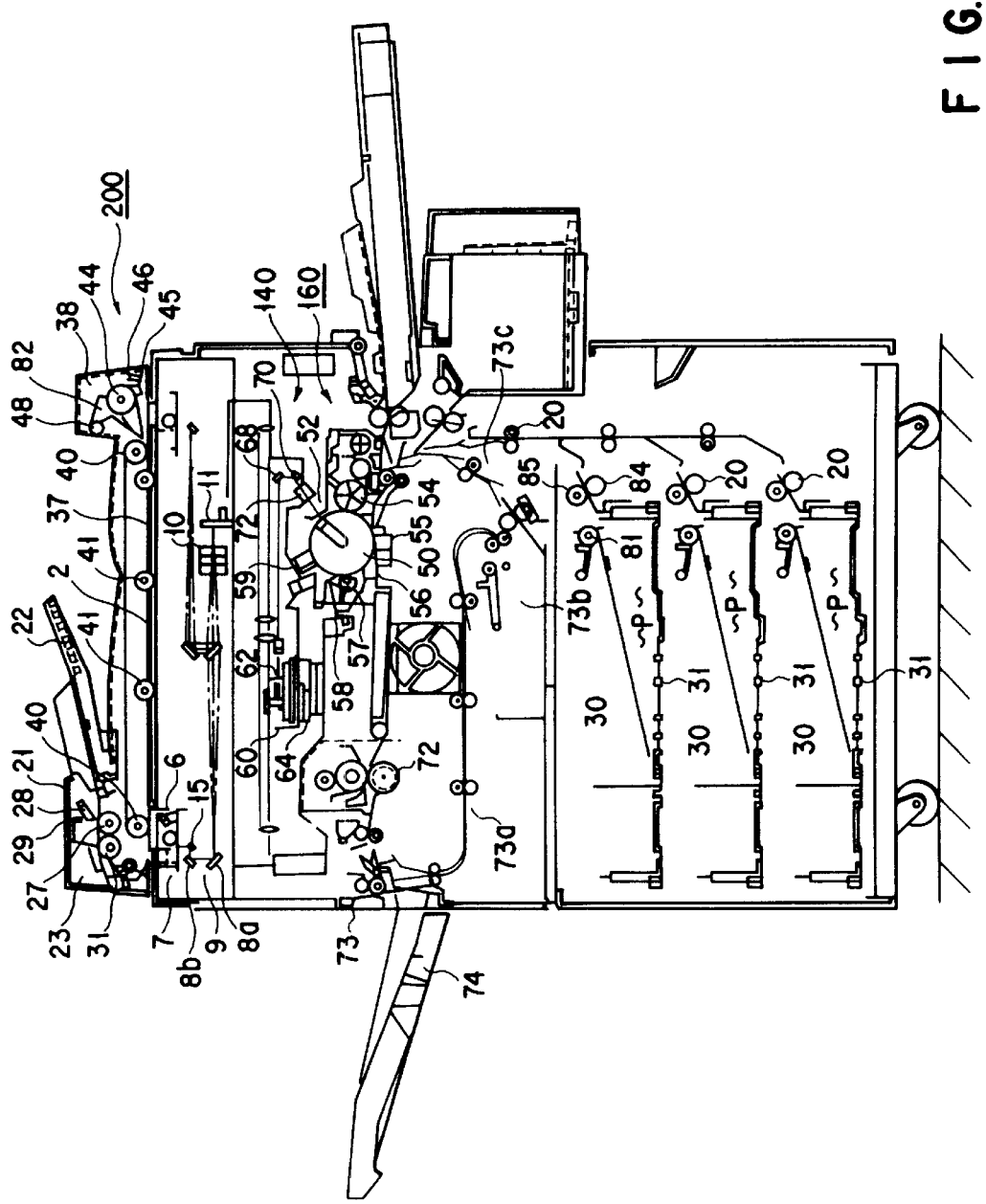
FIG. 1 is a sectional view of a composite image forming apparatus according to one embodiment of the present invention.

FIG. 1 schematically shows the overall arrangement of an electronic copying machine as an image forming apparatus according to the present invention. This apparatus includes an original scanning section 140 and an image forming section 160 and also has an automatic document feeder 200 in the upper portion of the apparatus.

In the automatic document feeder 200, the rear edge of a cover main body 21 as a housing is attached to the rear edge of the upper surface of the apparatus main body via a hinge so that the cover main body 21 is openable. An original table 2 can be exposed by pivoting the entire automatic document feeder 200 as needed. An original supply table 22 capable of holding a plurality of originals is provided in a slightly left-side portion on the upper surface of the cover main body 21. A supply means 23 for picking up and supplying originals one by one to one end (the left end in FIG. 2) of the original table 2 is arranged on one side of the apparatus. The supply means 23 consists of, e.g., a pickup roller 27 for picking up originals, a weight plate 28 for urging an original against the pickup roller 27, and an empty sensor 29 as an original sensor for sensing the set condition of an original on the original supply table 22. A feed roller 31 is also arranged in the original pickup direction of the pickup roller 27 and reliably feeds originals one by one. An original conveyor belt 37 for covering the original table 2 is extended on the upper surface of the original table 2. The original conveyor belt 37 is a wide endless belt with a white outer surface which is looped between a pair of belt rollers 40. The original conveyor belt 37 can be driven in forward and reverse directions by a belt driving mechanism (not shown). On the rear surface of the inner circumference of the original conveyor belt 37, a plurality of belt press rollers 41 for pressing the belt surface against the original table 2 and a set switch (not shown) for detecting whether the automatic document feeder is opened or closed are provided. An original supplied by the supply means 23 is conveyed from one end (left) to the other end (right) of the original table 2. A paper delivery means 38 is provided on the right-side portion of the apparatus. The paper delivery means 38 consists of, e.g., a conveyor roller 44, a pinch roller 45 for urging an original against the conveyor roller 44, and a discharge sensor 46 as an original detecting means for detecting the trailing end of an original fed in the paper delivery direction. A paper delivery roller 48 is disposed on the downstream side of an original discharge path. A gate 82 is also provided in the original discharge path to reverse the upper and lower surfaces of an original and guide the reversed original to the original table 2. This makes double-side copying of originals feasible.

The original scanning section 140 includes an exposure lamp 6 as a light source, a first carriage 7 in which a mirror 15 is arranged, a second carriage 9 in which mirrors 8a and 8b for bending an optical path are arranged, a lens 10, a photoelectric converter 11 for receiving reflected light, a driving system (not shown) for changing the positions of these components, and an A/D converter (not shown) for converting the output from the photoelectric converter 11, i.e., the image data, from analog data to digital data. The first and second carriages 7 and 9 are connected by a timing belt (not shown) so that the second carriage 9 moves at a half speed of the speed of the first carriage 7 in the same direction. Consequently, scan can be performed while the optical path length to the lens 10 is kept constant. The focal length of the lens 10 is fixed, and the lens 10 is moved along the optical axis when the magnification is varied. The photoelectric converter 11 photoelectrically converts the reflected light from an original and primarily consists of, e.g., a CCD line sensor. One pixel of an original corresponds to one element of the CCD sensor. An output from the photoelectric converter 11 is supplied to the A/D converter. The first and second carriages 7 and 9 and mirrors 12a and 12b are moved by respective stepping motors (not shown). The first and second carriages 7 and 9 are moved in accordance with motions of timing belts (not shown) looped between drive pulleys (not shown) coupled to the spindles of the stepping motors and idle pulleys (not shown). The lens 10 is moved along the optical axis in accordance with a motion of a spiral shaft (not shown) which is rotated by a corresponding stepping motor (not shown).

An electrooptic converter (semiconductor laser) 60 is arranged together with a collimator lens 62, a polygon mirror (polygonal reflecting mirror) 64, a lens 66, reflecting mirrors 68 and 70, and a lens 72. The electrooptic converter 60 irradiates a photosensitive drum 50 with laser light from an exposure device 52.

The image forming section 160 has a combination of a laser optical system and an electrophotographic system capable of image formation on transfer sheets. That is, the image forming section 160 has the photosensitive drum 50 which is an image carrier axially supported to be rotatable in substantially the center of the apparatus. Around this photosensitive drum 50, the exposure device 52, a developing device 54, a transfer charger 55, a separation charger 56, a cleaning charger 57, a discharger 58, and an electrostatic charger 59 are arranged in this order. The photosensitive drum 50 is evenly charged by the electrostatic charger 59. The original scanning section 140 outputs laser light to form an image of an original on the photosensitive drum 50 thus charged, thereby forming an electrostatic latent image.

The electrostatic latent image formed on the photosensitive drum 50 is developed by the developing device 54. The developed image is transferred by the transfer charger 55 onto a copy sheet P which is an image formation medium supplied from a paper feed cassette 30 as a paper feed means (to be described later) by a registration roller 20. The copy sheet P on which the developed image is transferred by the transfer charger 55 is separated by AC corona discharge done by the separation charger 56 and conveyed to a fixing device 72 through the conveyor belt. The developed image is melt-fixed by the fixing device 72, and the resultant copy sheet P is delivered onto a paper delivery tray 74 by a paper delivery roller pair 73. After the developed image is transferred to the copy sheet P and the copy sheet P is separated, the residual developing agent on the photosensitive drum 50 is removed by the cleaning charger 57. The potential on the photosensitive drum 50 is then decreased to a predetermined level or lower by the discharger 58, making the next copying operation possible.

In double-side copying in which printing is performed on the both sides of the copy sheet P, the copy sheet P on which the developed image is melt-fixed by the fixing device 72 is conveyed through a convey path 73a and stored in a tray (to be referred to as an ADD hereinafter) 73b with an automatic side reversing mechanism. The sheet P which is stored in the ADD 73b and on one side of which printing is already done is conveyed to the transfer charger 55 through a convey path 73c, and another developed image is transferred to the other side which is left unprinted.

The paper feed cassettes 30 are provided as paper feed means which are detachably, vertically arranged from the front side of the apparatus main body 1. Each paper feed cassette 30 consists of a cassette case 31 as a housing which contains copy sheets P. A sheet pickup end portion of the cassette case 31 is inclined in the sheet pickup direction. The copy sheets P stored in the cassette case 31 of the paper feed cassette 30 are picked up from the uppermost one by pickup rollers 81. The copy sheets P thus picked up by the pickup rollers 81 and fed toward the sheet pickup end portion of the cassette case 31 are separately conveyed one by one to the image forming section 160 by a sheet separator which is arranged in the upper portion in the sheet pickup end portion of the cassette 31 and consists of a paper feed roller 84 and a separation roller (or separation pad) 85.

Figure 2:
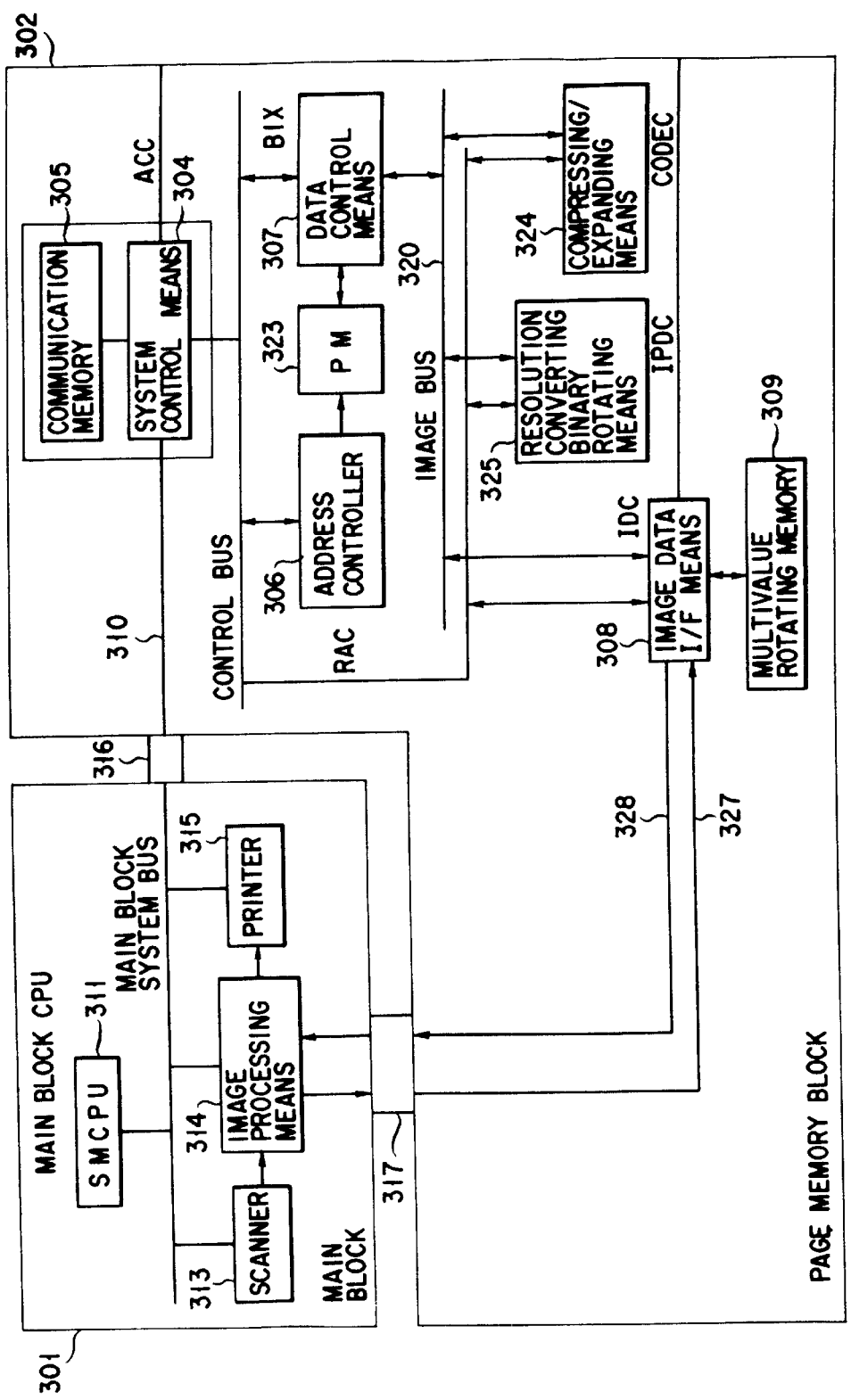
FIG. 2 is a block diagram showing the system configuration of the composite image forming apparatus.
Figure 3:
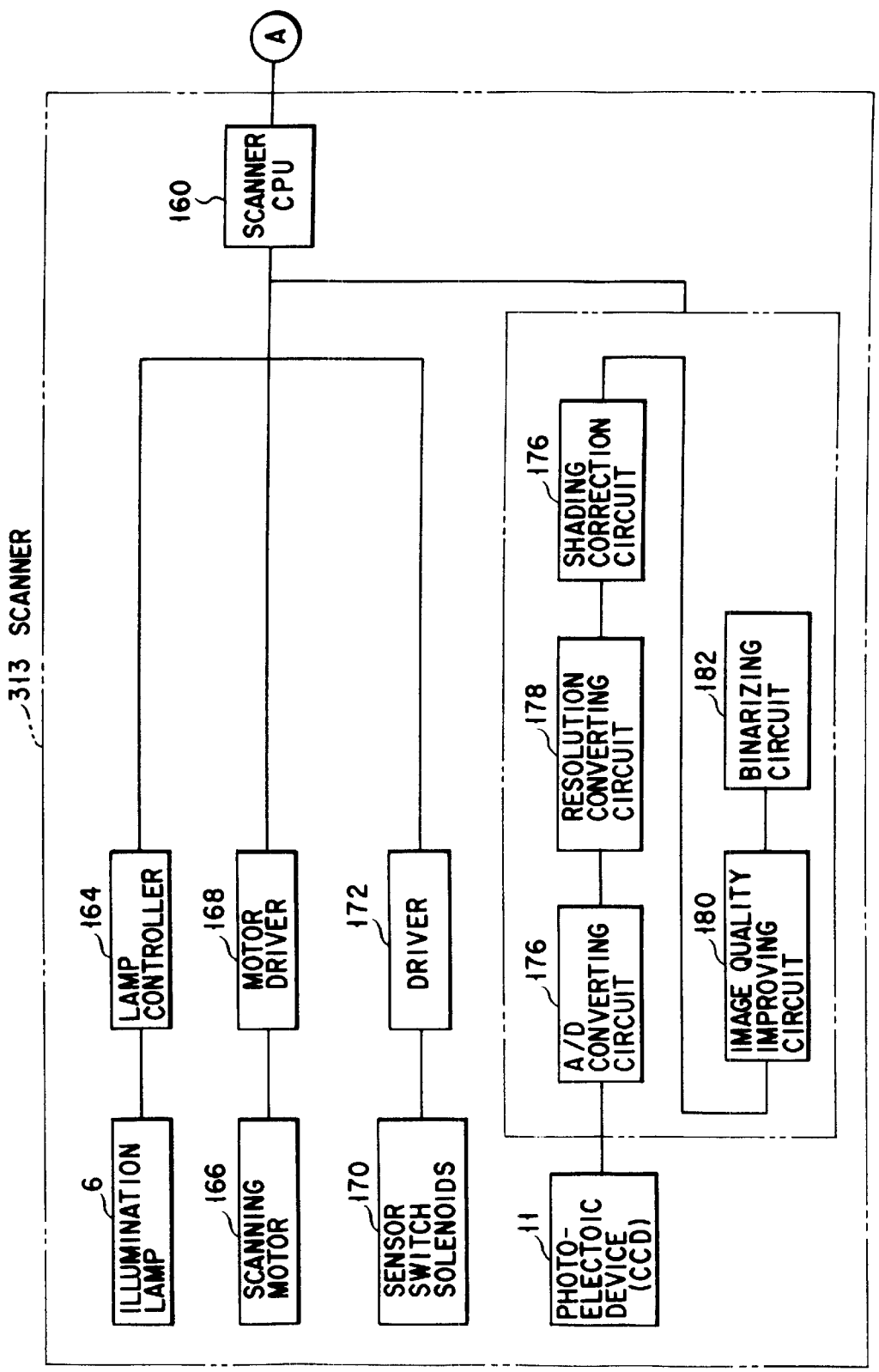
FIG. 3 is a block diagram showing the arrangement of a scanner section.
Figure 5:
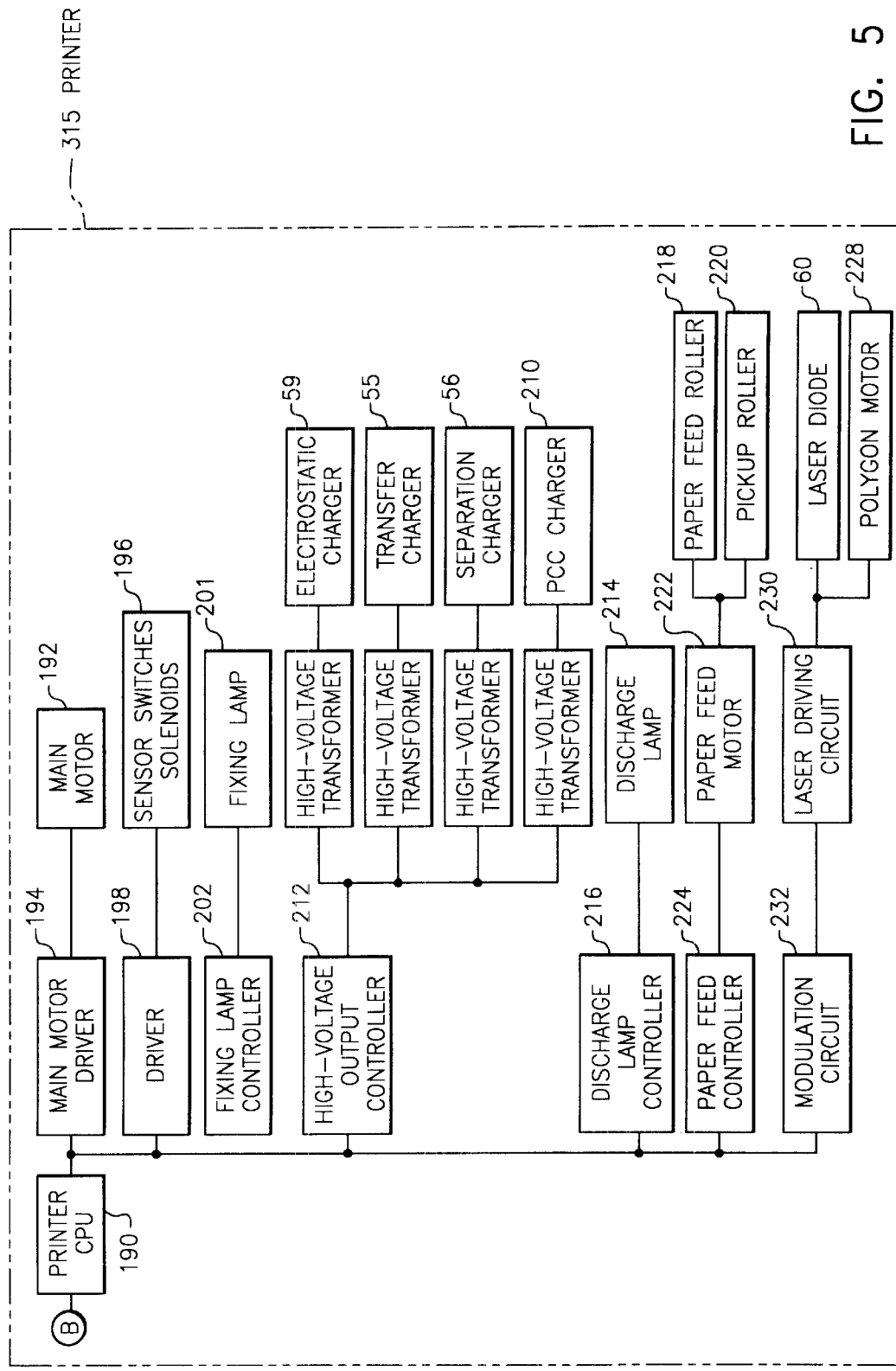
FIG. 5 is a block diagram showing the arrangement of a printer section.

Control circuits of the image forming apparatus will be described below with reference to FIGS. 2 to 5. FIG. 2 is a schematic block diagram showing the arrangement of an image formation/storage system such as a digital copying machine control system according to the embodiment. FIGS. 3, 4, and 5 illustrate a scanner section, a CPU section, and a printer section, respectively.

This digital copying machine control system is roughly divided into two blocks: a main block 301 which constitutes a digital copying machine by connecting a scanner 313 and a printer 315 by an image processing means 314; and a page memory block 302 which stores input image data from the main block 301 and transfers the stored image data back to the main block 301, thereby realizing memory copying.

The main block 301 and the page memory block 302 are connected via a main block system interface 316 for exchanging control data and a main block image interface 317 for exchanging image data.

The main block 301 consists of the input means (scanner) 313, the output means (printer) 315, the image processing means 314, and a control means (main block CPU) 311 for controlling these means.

A main CPU 100 of the control means (main block CPU) 311 is connected to a ROM 102, a RAM 104, an image memory 106, a timer memory 108, a password code memory 110, a timer 112, an internal interface 122, an external interface 124, a facsimile interface 126, a printer interface 128, an auxiliary storage interface 130, a code converting circuit 132, and a compressing/expanding circuit 134. An operation panel 114 is connected to the internal interface 122. The operation panel 114 includes, e.g., an LCD display 116, a ten-key pad 118, an input end key, a termination instruction key, and a job password mode button 120. The facsimile interface 126 is connected to a public line 136, and the printer interface 128 is connected to an external device 138, The auxiliary storage interface 130 is connected to an IC card reader/writer 142, a hard disk drive 144, and the like.

Operations such as storage and read of image information are performed by the main CPU 100. In storing a password code and image information, for example, the image information read by the scanner section under the control of a scanner CPU 160 is stored in the image memory 106 and the password code memory 110 in accordance with an instruction from the main CPU 100. The main CPU 100 issues an instruction when a mode is determined by an input (key input) from the operation unit. Time setting and the like are similarly done.

At this time, the main CPU 100 stores the image information at identical addresses of the two memories. Alternatively, the main CPU 100 includes, e.g., a memory address memory for storing paired addresses of these memories. In either way, the main CPU 100 issues an instruction so that pieces of image information are stored in a one-to-one correspondence with password codes and designated times.

Details of the scanner 313 will be described below with reference to FIG. 3. The scanner CPU 160 of the scanner 313 is connected to a lamp controller 164 for controlling the illumination lamp 6, a motor driver 168 for controlling a scanning motor 166, and a driver 172 for driving sensors, switches, and solenoids 170, and controls these parts. Also, the CPU 160 is connected to components for processing image information from the photoelectric device 11, i.e., an A/D converting circuit 176, a resolution converting circuit 178, a shading correction circuit 176, an image quality improving circuit 180, and a binarizing circuit 182, and controls these components.

Details of the printer 315 will be described below with reference to FIG. 5. In the printer 315, a printer CPU 190 is connected to and controls a main motor driver 194 for driving a main motor 192, a driver 198 for driving sensors, switches, and solenoids 196, a fixing lamp controller 202 for controlling a fixing lamp 201, a high-voltage output controller 212 for controlling an electrostatic charger 59, a transfer charger 55, a separation charger 56, and a PCC charger 210, a discharge lamp controller 216 for controlling a discharge lamp 214, a paper feed controller 224 for controlling a paper feed motor 222 for driving the paper feed roller 218 and a pickup roller 220, the electrooptic converter (laser diode) 60, and a modulation circuit 232 for controlling a laser driving circuit 230 for a polygon motor 228.

The page memory block 302 will be described below with reference to FIG. 2. The page memory block 302 consists of a system control means 304, a storage means (page memory)

323, an address controller 306, an image bus 320, a control bus 321, a data control means 307, an image data I/F means 308, a resolution converting/ binary rotating means 325, a compressing/expanding means 324, and a multivalue rotating memory 309. The system control means 304 controls access from the main block 301 to the page memory 323 and incorporates a communication memory 305. The page memory 323 temporarily stores image data. The address controller 306 generates an address of the page memory 323. The image bus 320 transfers data between the individual devices in the page memory block 302. The control bus 321 transfers control signals between the system control means 304 and the individual devices in the page memory block 302. The data control means 307 controls the data transfer performed between the page memory 323 and the other devices through the image bus 320. The image data I/F means 308 interfaces image data to be transferred to the main block 301 through the main block image interface 317. The resolution converting/binary rotating means 325 converts the resolution of image data each received from devices having different resolutions into the resolution of the printer 315 of the main block 301. Also, the resolution converting/binary rotating means 325 executes 90° rotating processing for binary image data. The compressing/ expanding means 324 compresses input image data for devices, such as a facsimile transmission device and an optical disk storage device, which transmit compressed image data, and expands compressed image data so as to visualize the data via the printer 315. The multivalue rotating memory 309 is connected to the image data I/F means 308 and used to rotate image data 90° or −90° when the data is output from the printer 315. The details of the individual means in the page memory block 302 will be described later.

Figure 8A:
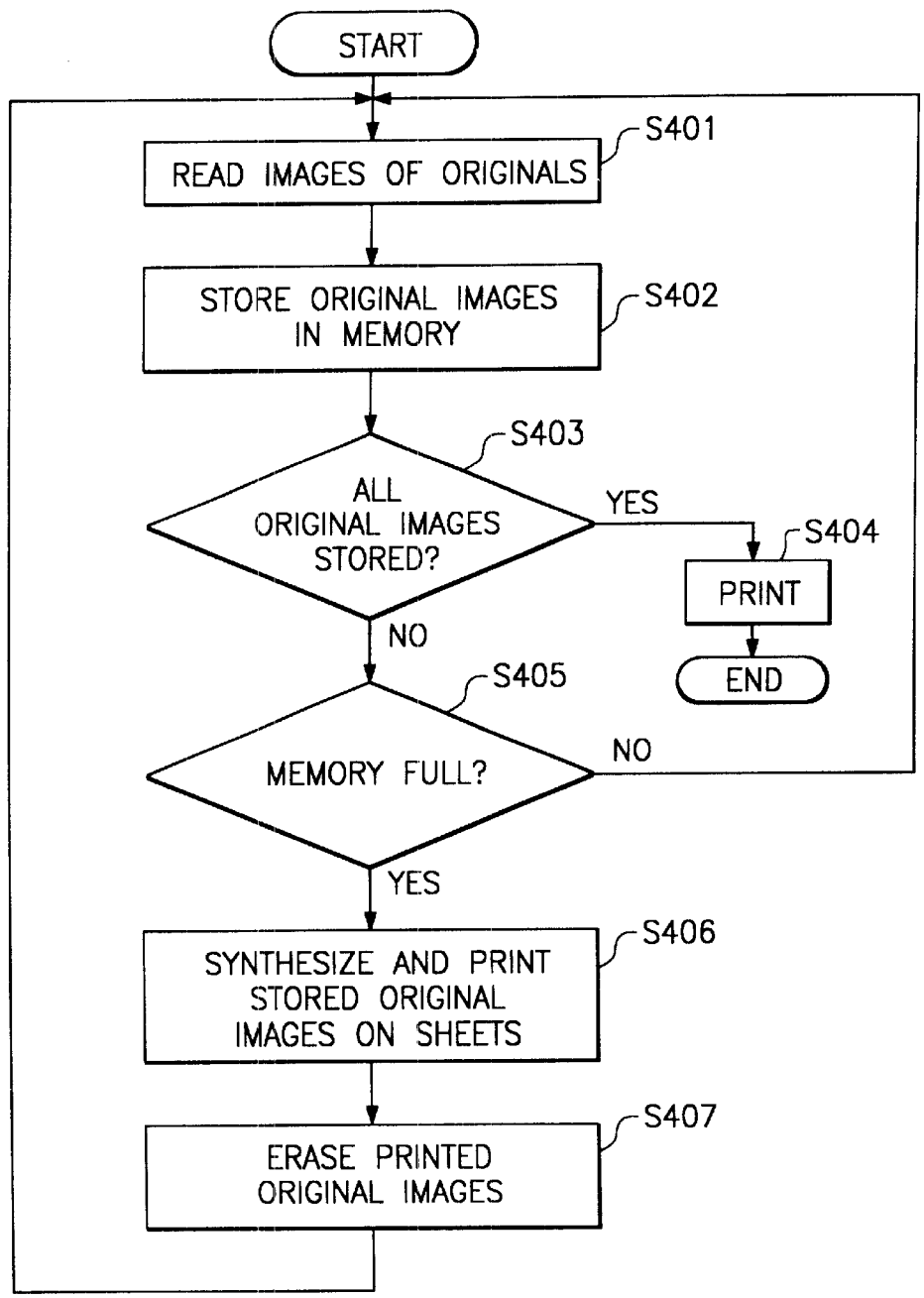
FIG. 8A is a flow chart for explaining the overall operation of the present invention.
Figure 8B:
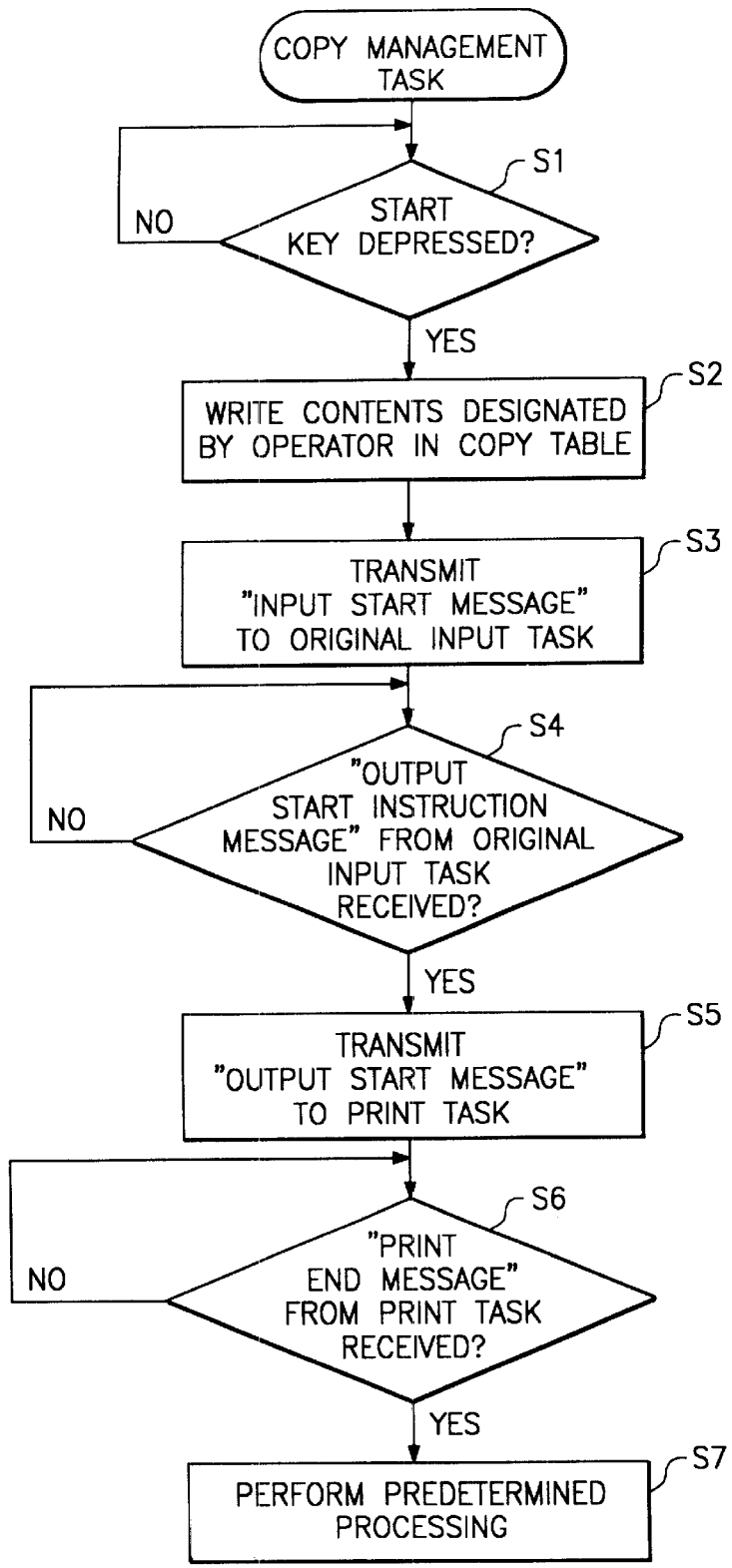
FIG. 8B is a flow chart for explaining the overall operation of the copy management task.
Figure 13:
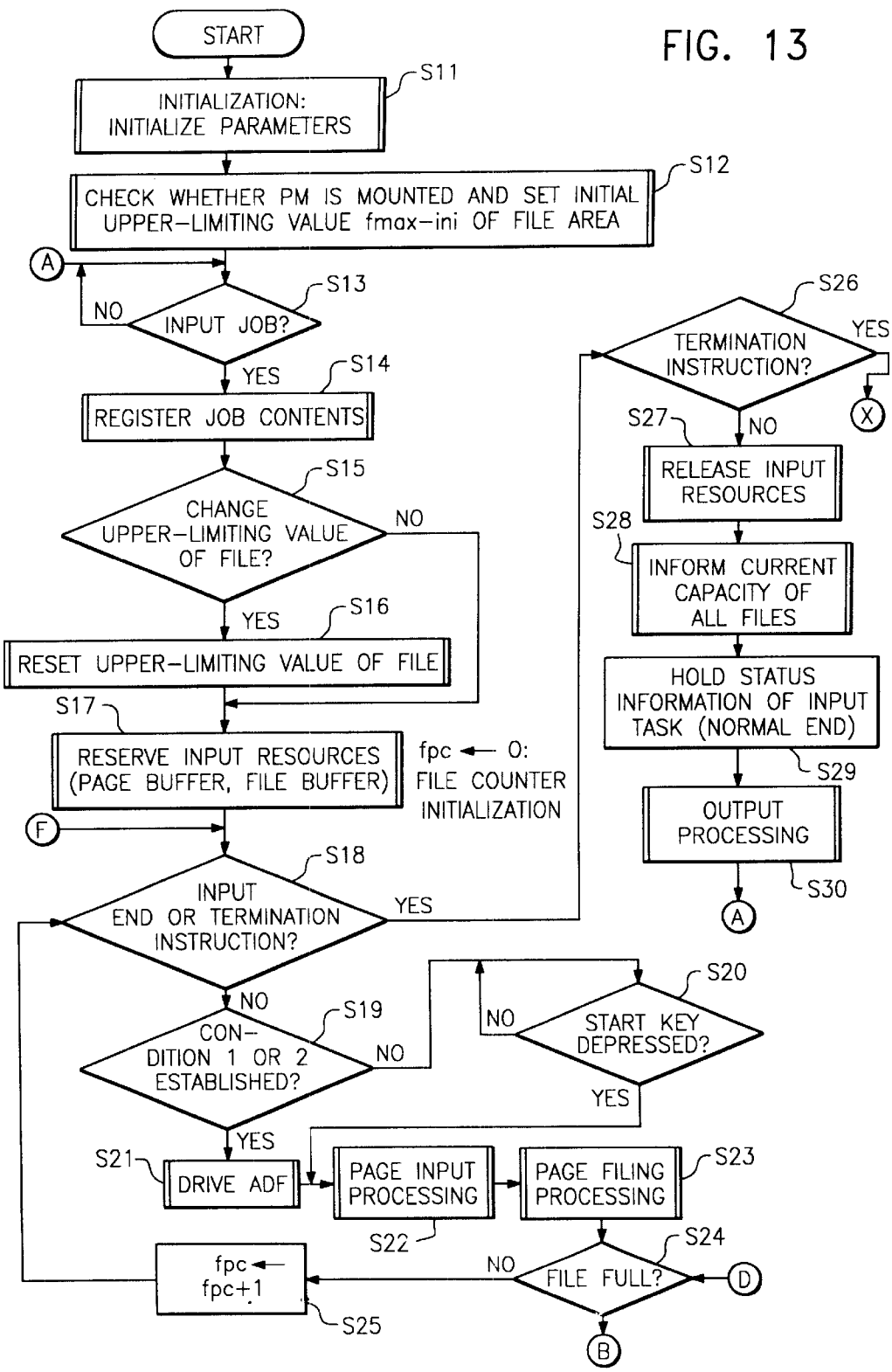
FIG. 13 is a part of a flow chart for explaining the operation of the original input task.
Figure 14:
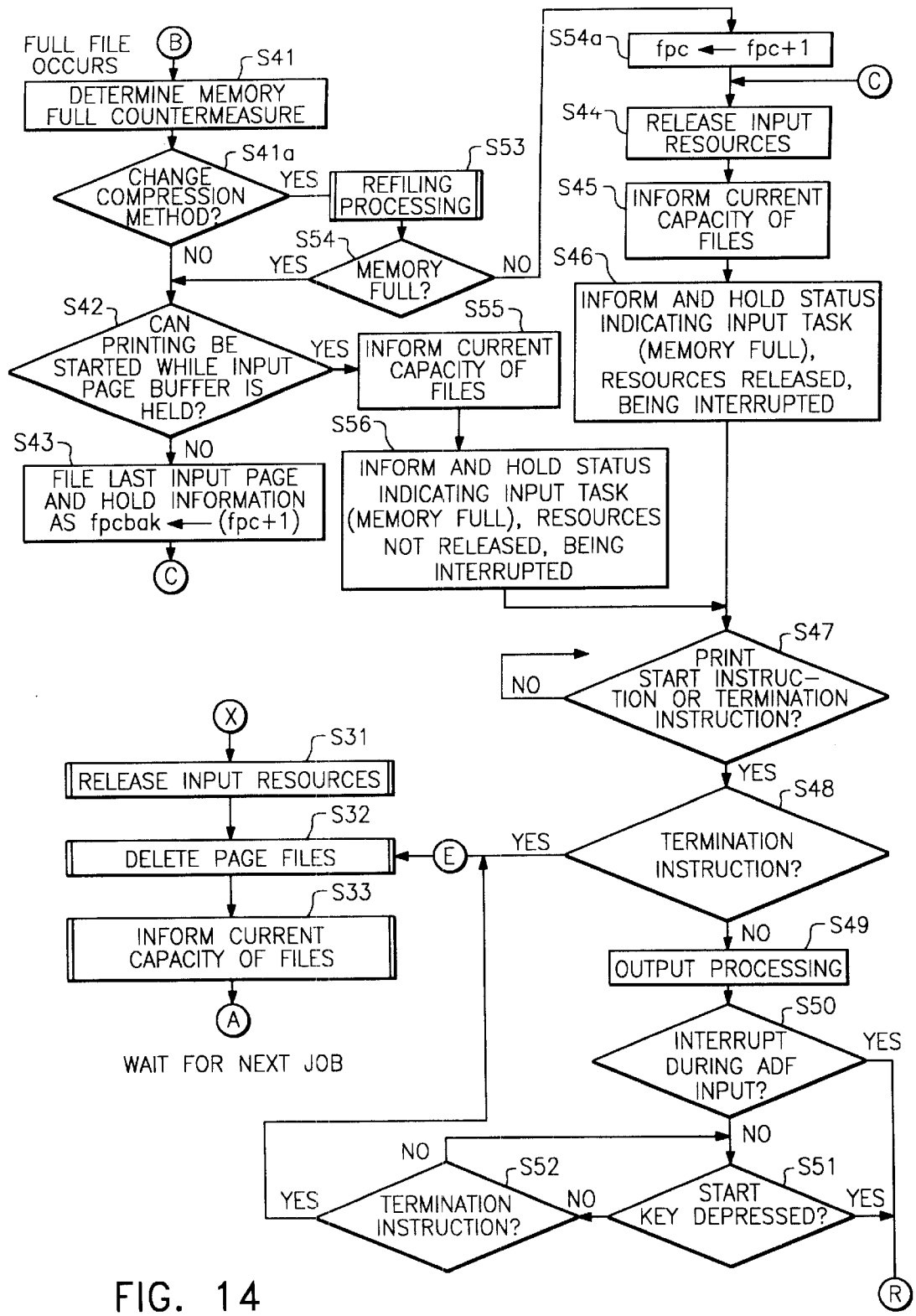
FIG. 14 is a part of a flow chart for explaining the operation of the original input task.
Figure 15:
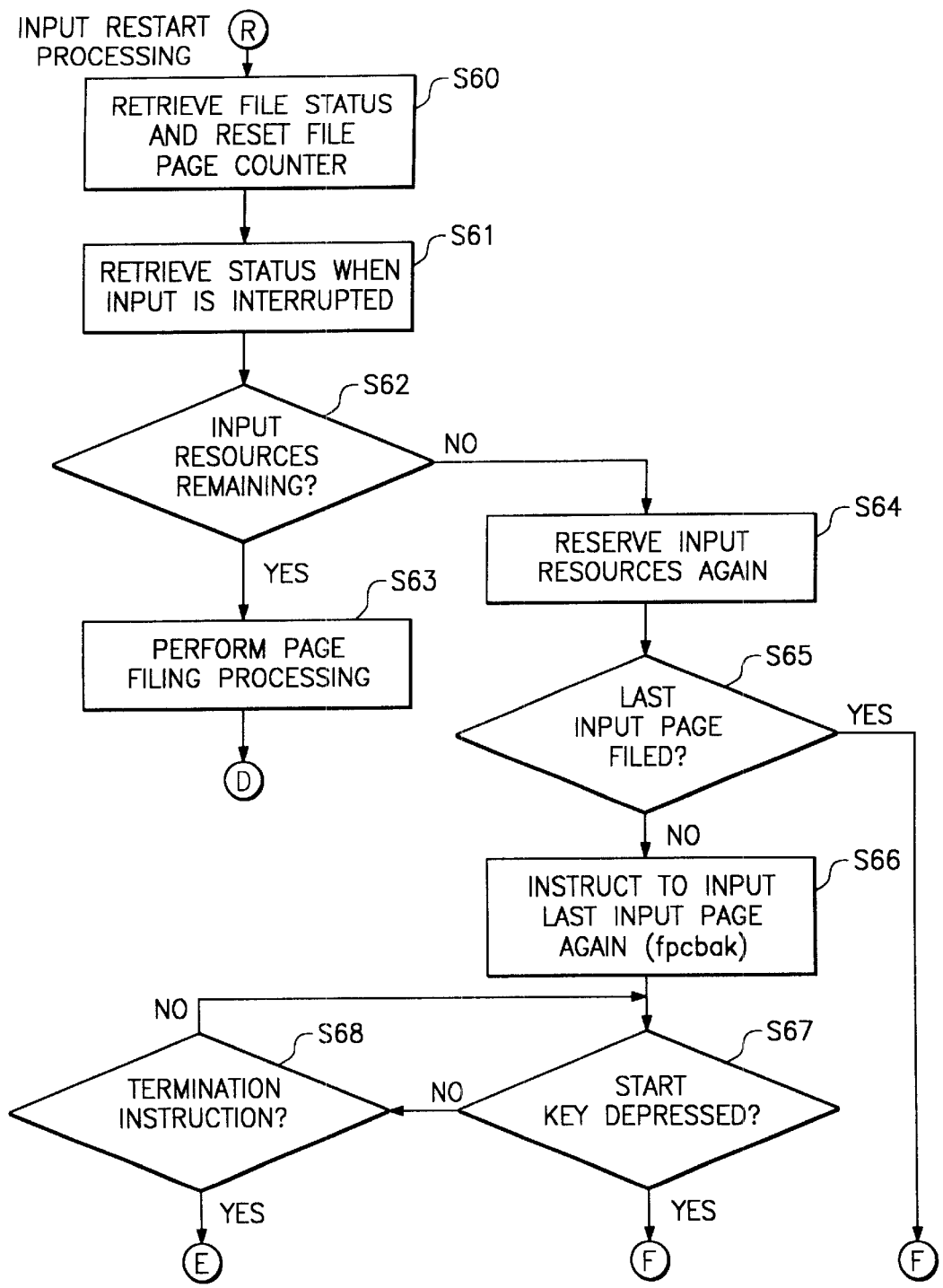
FIG. 15 is a part of a flow chart for explaining the restart operation of the original input task.

The ROM 102 of the main CPU 311 of this copying machine stores a control program for executing a copy management task A shown in the flow chart of FIG. 8B, a control program for executing an original input task B shown in the flow charts of FIGS. 13 to 15, and a control program for executing a print task C shown in the flow charts of FIGS. 16 to 22.

Figure 6:
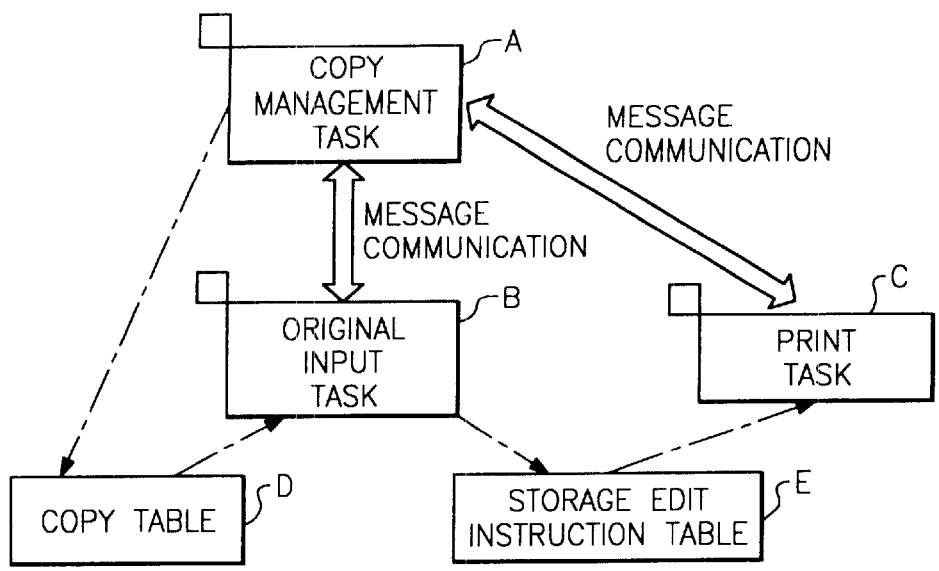
FIG. 6 is a view showing the relationship between a copy management task, an original input task, and a print task.

As illustrated in FIG. 6, message communications are done between the copy management task A and the original input task B and between the copy management task A and the print task C.

The contents (the number of copies, the original size, the size magnification, the binding margin direction, the binding margin width, the cover type, and the presence/absence of single-side reduction joining) designated from the operation panel 114 are input to the copy management task A.

The RAM 104 of the main CPU 311 has a copy table D 20 and a storage edit instruction table E.

The contents designated from the operation panel 114 are written in the copy table D.

The designations (the output order (group, sort), the number of copies, the file number, the resolution, the number of input pages, the double-side printing/single-side printing, and the page input completion information) relating to storage copying are set in the storage edit instruction table E.

Figure 7:
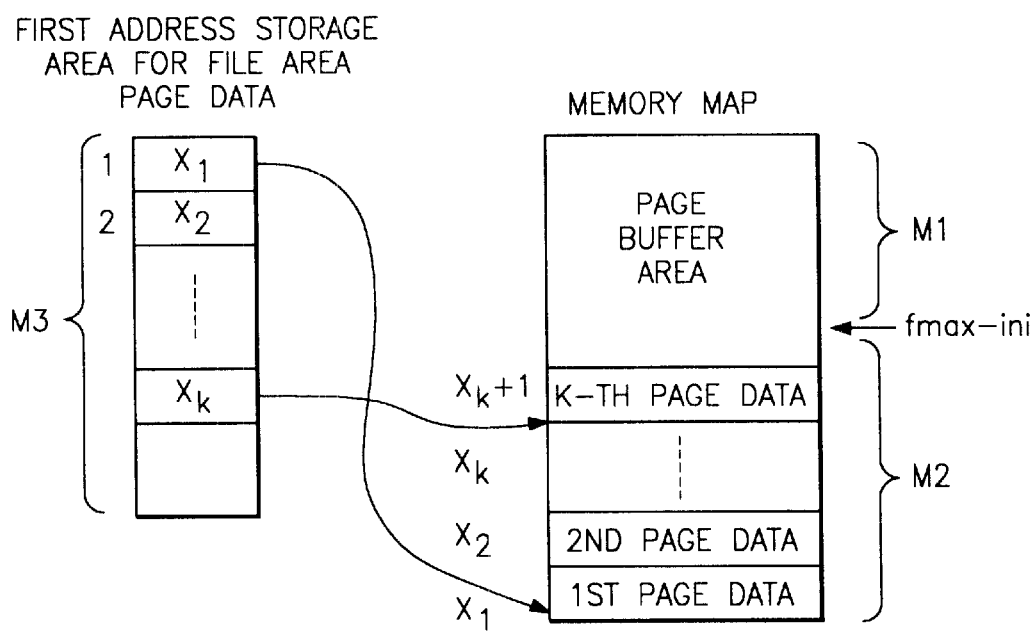
FIG. 7 is a view showing the relationship between a page buffer area M1 and a file area M2 of a page memory.

As illustrated in FIG. 7, the page memory 323 is divided into a page buffer area M1, in which image data of an original read by the scanner 313 is written, and a file area M2, in which compressed data of the image data is written. The file area M2 is partitioned in units of pages.

The first address of each page of this file area M2 is stored in a first address storage area M3 for each file area page data.

Figure 9:
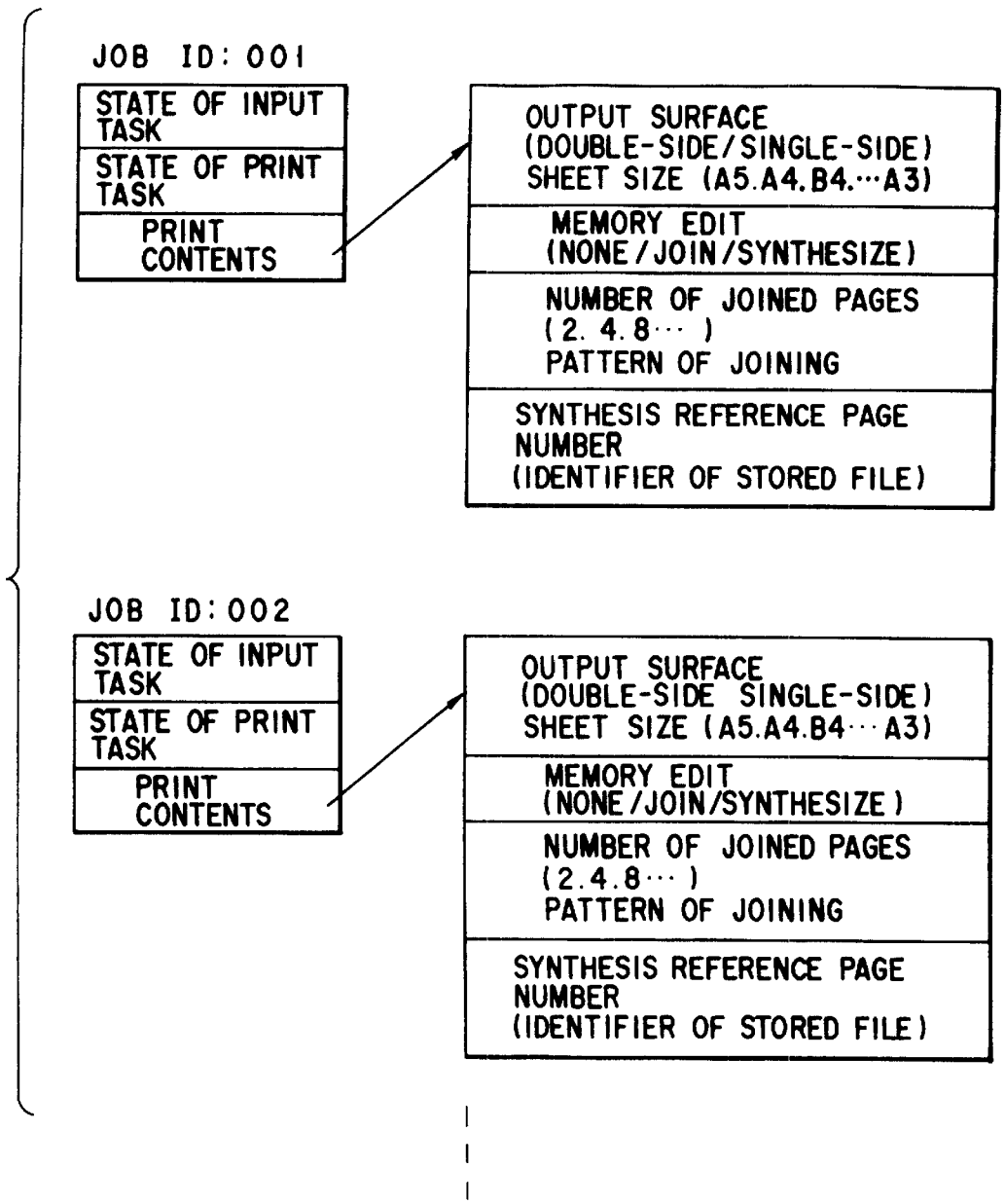
FIG. 9 is a view showing tables in which the states of an input task (original read processing) and an output task (printing) are set in a one-to-one correspondence with job numbers.
Figure 10:
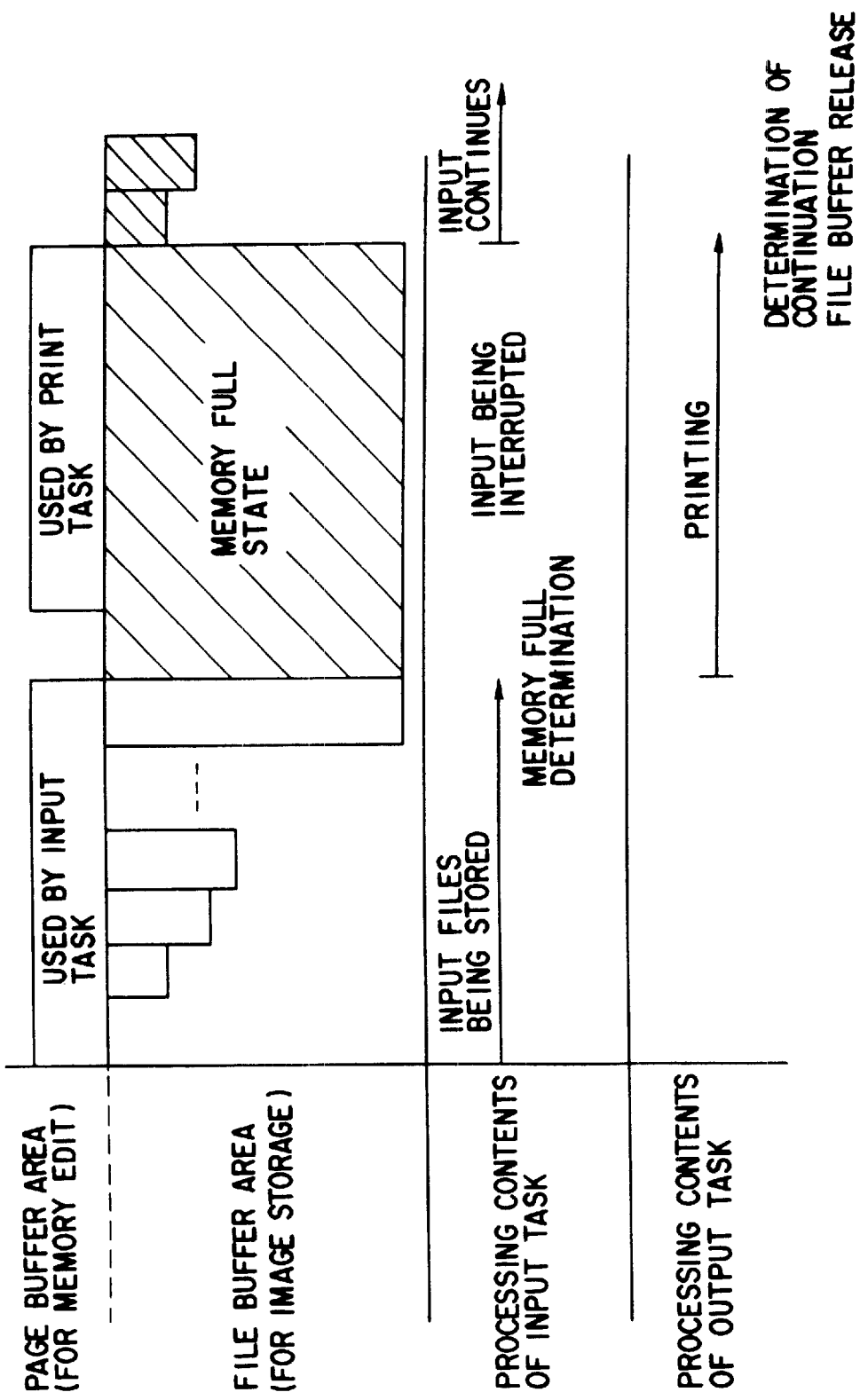
FIG. 10 is a view showing the relationship between the page buffer area M1 and the file buffer M2 when the file full occurs.

As illustrated in FIG. 9, the RAM 104 of the main CPU 311 also includes tables in which the states of an input task (original read processing) and an output task (printing) are set in a one-to-one correspondence with job numbers. The term "job" herein used means a single copying operation; e.g., an operation of performing double-side copying for ten originals is a single job, and an operation of making ten single-side copies for each of five originals in a sort mode is a single job.

The overall operation of the present invention will be described below with reference to the flow chart in FIG. 8A which shows the characteristic feature of the operation of the present invention.

Images of originals to be copied are picked up primarily by the scanner 313 (S401). The original images are sequentially stored in the page memory block 302 (S402). Whether all the original images are stored is checked (S403). If the page memory block becomes full before all the images are stored (S405), only portions of the original images which can be printed (these original images are synthesized if necessary) are printed on sheets as image formation media and output by the printer 315 (S406). Only the printed original images are erased from the page memory block, and unprinted original images are left behind. After an empty area is formed in the page memory in this way, images of the remaining originals are picked up (S401). If the memory becomes full again, partial printing is similarly performed. If all the original images are stored in the memory before the memory becomes full, these original images are copied in a regular manner.

With this operation, even if the amount of original images is too large in processing, particularly in sort processing, in which all original images are initially stored in the memory buffer, an empty area is formed in the page memory by properly printing the stored images. This allows a smooth copying operation.

The operations of the embodiment of the present invention with the above arrangement will be described in detail below. First, the operations of the copy management task and the original input task will be described with reference to FIGS. 8B and 13 to 15.

In FIG. 8B, when an operator depresses the start key on the operation panel 114 after designating storage copy, this information is transmitted to the copy management task A via message communication under the control of the CPU 100. The copy management task A checks whether the start key for starting this job is depressed (S1).

If YES in step S1, the contents designated from the operation panel 114 by the operator are written in the copy table D (S2).

In this manner, the number of copies, the original size, the size magnification, the binding margin direction, the binding margin width, the cover type, the presence/absence of single-side reduction joining, and the like information are stored in the copy table D.

"Input start message" is then transmitted to the original input task B (S3).

When "input start message" is thus transmitted to the original input task B, the operation of the original input task B as illustrated in FIGS. 13 to 15 is started.

The operation of the original input task B will be described below with reference to FIGS. 13 to 15. In FIG. 13, initialization for initializing parameters is performed (S11).

Subsequently, whether the page memory 323 is mounted is checked, and an initial value fmax-ini of an upper-limiting value fpc-max of the file area M2 in FIG. 7 is set (S12).

Whether an input job is present is then checked (S13). That is, whether "input start message" is transmitted from the copy management task A to the original input task B is checked (S13).

If YES in step S13, the contents of the job are registered by referring to the copy table D formed by the copy management task A (S14). In this processing, as shown in FIG. 9, the state of an input task (original input task), the state of a print task, and the print contents are written for each job ID. The print contents are formed in the RAM 104 on the basis of the contents set on the operation panel 114 by the user. The term "job" represents a unit of copying processing set by the operator. For example, copying processing of making twenty single-side copies is managed as a single job, and making five double-side copies in a sort mode is managed as a single job.

Whether the file upper-limiting value is to be changed is checked (S15). Information concerning this change is set in the RAM 104. If YES in step S15, the file upper-limiting value fmax-ini is reset (S16).

Input resources are then reserved (S17). For example, open processing for the page buffer M1 and the file buffer M2 is performed, and input page counter fpc←0 is set.

Subsequently, whether an input end or termination instruction is input from the operation panel 114 is checked (S18). If NO in step S18, whether an ADF input is present and a condition 1 or 2 is met is checked (S19). The condition 1 is that an ADF original is placed on the original supply table 22 and is the first input page (note that the first input page is determined by checking whether the input page counter fpc is "0"). The condition 2 is that an ADF original is present and is the first page after restart, and no original is placed on the original table 2.

If YES in step S19, the ADF is driven. If NO in step S19, whether the start key is depressed is checked (S20).

Since the ADF is driven after YES is determined in step S42 (to be described later) when the memory full occurs, no original is set on the original table 2. Accordingly, the condition 2 is established in step S19, and the ADF is automatically driven. That is, the ADF can be automatically driven when the operation is restarted after the memory full is canceled.

If YES in step S20 or after the processing in step S21, page input processing is executed (S22). That is, image data of one original read by the scanner 313 is temporarily stored in the page buffer M1.

This image data of one original temporarily stored in the page buffer M1 is compressed by the compressing/expanding means 324 and stored in the file buffer M2 (S23).

Whether the file buffer M2 becomes full is then checked (S24). That is, it is checked whether the upper-limiting value fpc-max of the file buffer M2 is exceeded if the image data of one original page compressed by the compressing/expanding means 324 is stored in the file buffer M2.

If YES in step S24, the flow advances to processing starting from step S41 in FIG. 14. This processing will be described later.

If NO in step S24, the input page counter fpc is incremented by "1" (S25), and the flow returns to step S18.

Thereafter, image data of one original page is read into the page buffer M1 by ADF driving or each time the start key is depressed unless the file buffer M2 becomes full. This image data of one original page is compressed by the compressing/expanding means 324 and stored in the area of the file buffer M2 indicated by the input page counter fpc.

When the original is completely input and the operator depresses the input end key on the operation panel 114, YES is determined in step S18. Accordingly, whether a termination instruction is input is checked (S26).

Since the termination instruction key is not operated, NO is determined in step S26. Consequently, the input resources (e.g., the page buffer M1 and the scanner) are released (S27), and the total storage file capacity of the file buffer M2 is informed (step S28). Additionally, a status indicating that the input task is normally ended is set in the state of the input task of one of the tables (FIG. 9) corresponding to the present job ID (S29).

Figure 16A:
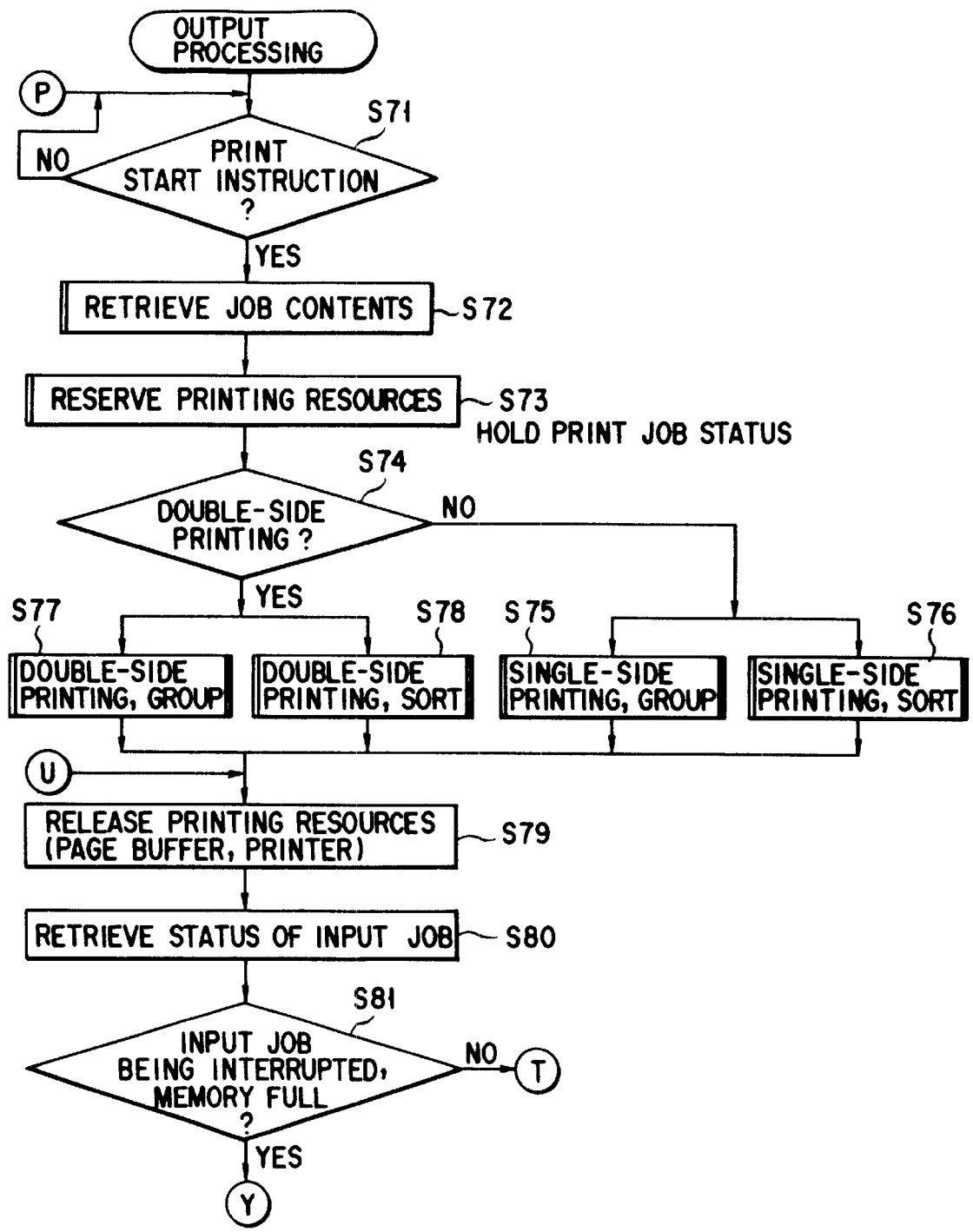
FIGS. 16A and 16B are parts of flow chart for explaining the operation of the output processing.
Figure 16B:
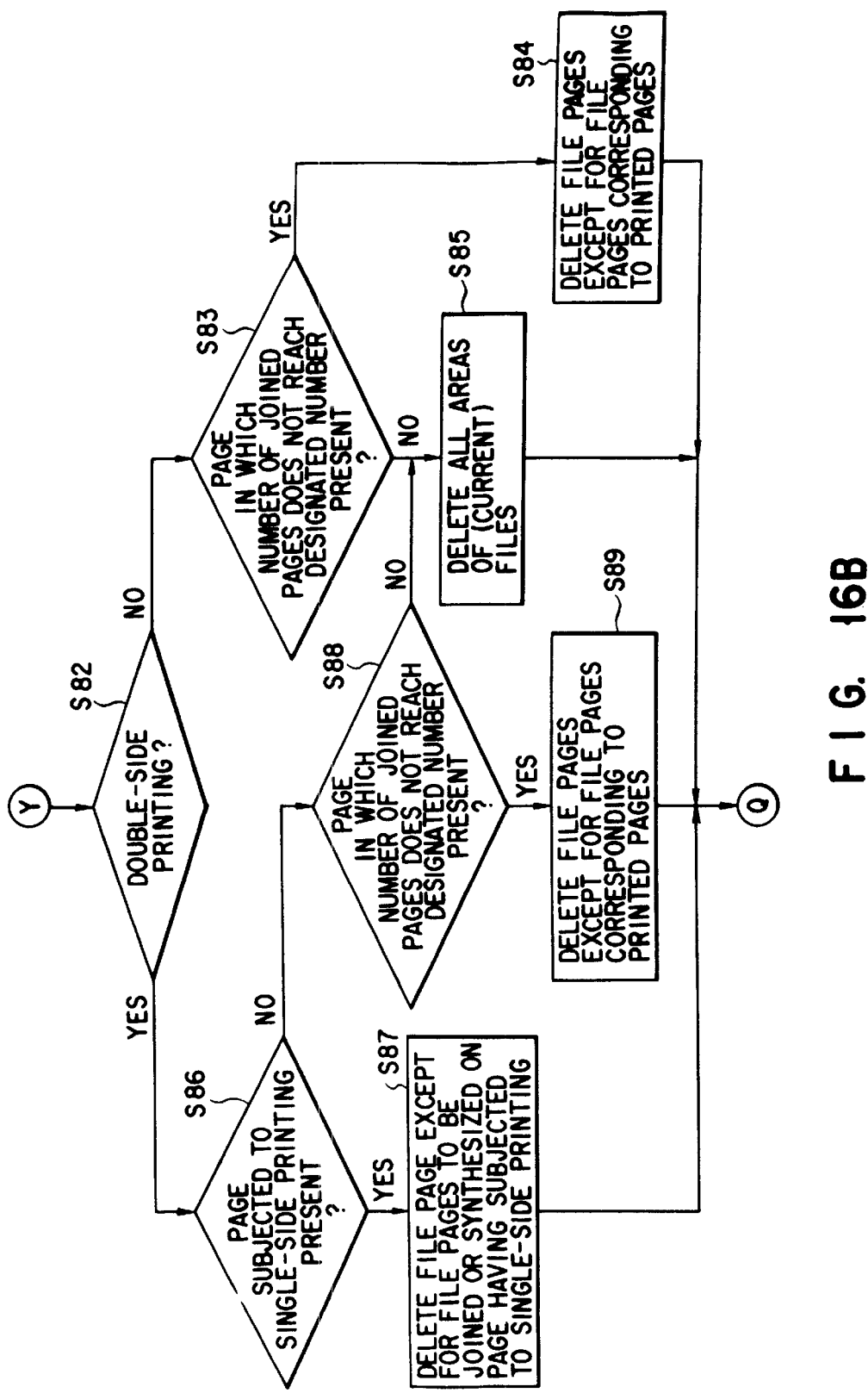
Figure 17:
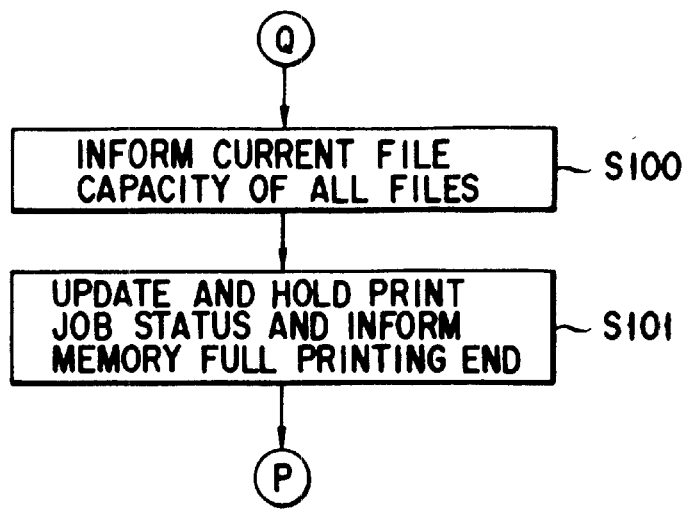
FIG. 17 is a part of a flow chart for explaining the operation of the output processing.
Figure 18:
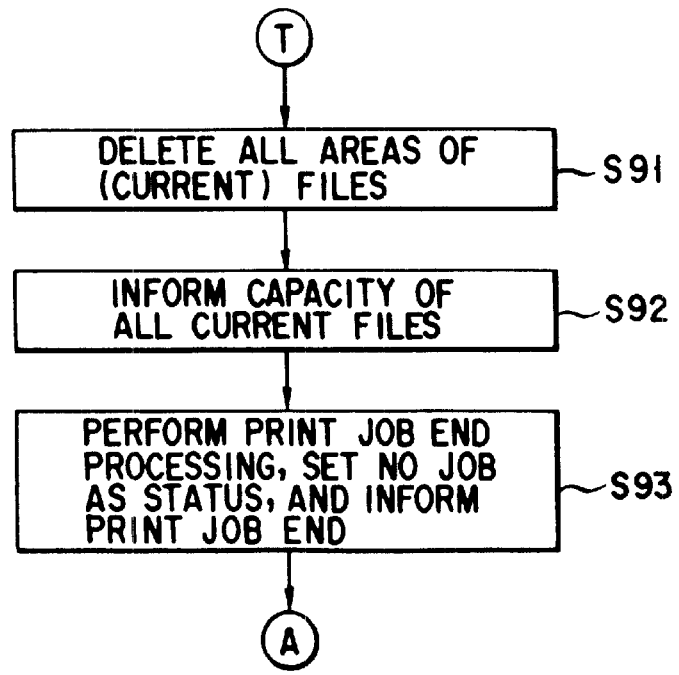
FIG. 18 is a part of a flow chart for explaining the operation of the output processing.

Output processing to be described in detail later with reference to FIGS. 16 and 17 is performed (S30), and the flow returns to step S13 described above.

On the other hand, if YES is determined in step S26, the input resources (e.g., the page buffer M1 and the scanner) are released (S31), the file buffer M2 is deleted (S32), the current capacity of the file buffer M2 is informed (S33), and the flow returns to step S13. That is, if the termination instruction key is operated on the operation panel 114 while originals are being input, the page buffer M1 and the file buffer M2 are released.

If YES in step S24, i.e., if it is determined in step S24 that the file buffer M2 is full ({current storage amount fpcmax of file buffer M2}>{initial value fmax-ini of file buffer M2}), a file full countermeasure which is preset in the RAM 104 is retrieved (S41).

Subsequently, whether this countermeasure is to "change the compression method" is checked (S41a). If YES in step S41a, image data of one original page temporarily stored in the page buffer M1 is compressed by another compression method, in which the compression ratio is larger than that in the compression method done in step S23, and stored in the file buffer M2 (S53).

More specifically, compression done by MH (Modified Huffman) is changed to compression by MR (Modified Read) or by MMR (Modified Modified Read).

Figure 27:
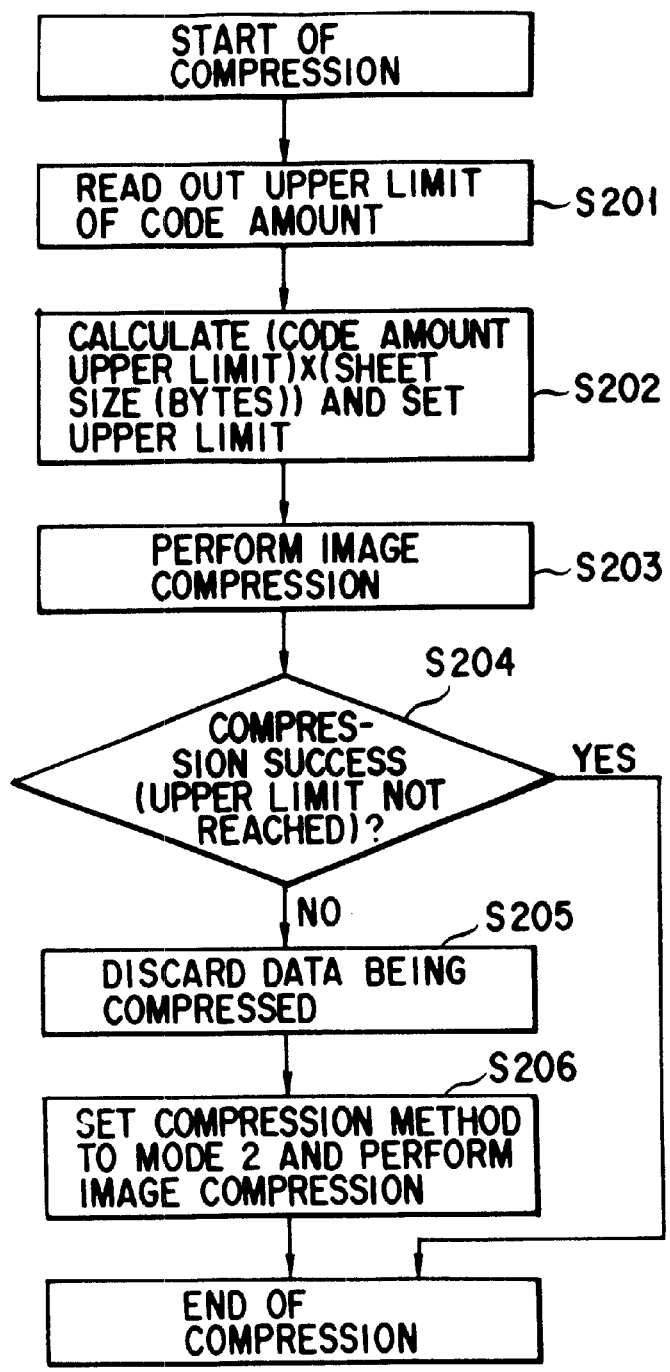
FIG. 27 is a flow chart for explaining the procedure of compression of image information.

FIG. 27 is a flow chart for best explaining an embodiment in which compression is changed when the file buffer becomes full.

First, the upper limit of a code amount is read out (S201). Code amount upper limit x sheet size (the number of bytes) is then calculated, and thereby the upper limit of a code amount is determined (S202). Image data is compressed by some method (S203). If the compressed image data does not reach the code amount upper limit, this means that image data storable in the file buffer is attained, so compression is successfully performed (S204). However, if the compressed image data has a capacity exceeding the upper limit, it is determined that compression is failed. Therefore, image data currently being compressed is discarded (S205). This image data is then compressed by a compression method with a higher compression ratio (S206). In this manner, the compression method is changed to file all image data.

Referring back to FIG. 14, whether the file buffer M2 becomes full during this storage is checked (S54). If NO in step S54, the input page counter fpc is incremented by "1", the input resources (e.g., the page buffer M1 and the scanner) are released (S44), and the total file capacity of the file buffer M2 is informed (S45). Additionally, a status indicating that the input task is "memory full", "resources released", and "being interrupted" is set in the state of the input task of one of the tables (FIG. 9) corresponding to the current job ID (S46).

Subsequently, whether a print start instruction or a termination instruction is entered from the operation panel 114 is checked (S47). If YES in step S47, whether a termination instruction is entered from the operation panel 114 is checked (S48). If YES in step S48, the flow advances to the processing starting from step S32. That is, the file buffer M2 is deleted (S32), the current capacity of the file buffer M2 is informed (S33), and the flow returns to step S13 described previously.

On the other hand, if NO in step S48, the output processing (print output) to be described later with reference to the flow charts in FIGS. 16 and 17 is performed, and whether interrupt occurs during ADF input is checked (S50). If YES in step S50, the input restart processing in the flow chart of FIG. 15 is executed.

If NO in step S50, whether the start key is depressed is checked (S51). If NO in step S51, the input restart processing in the flow chart of FIG. 14 is executed.

On the other hand, if NO in step S51, whether "termination instruction is issued" is checked (S52). If YES in step S52, the processing starting from step S32 is executed. That is, the file buffer M2 is deleted (S32), the current capacity of the file buffer M2 is informed (S33), and the flow returns to step S13. If NO in step S52, the flow returns to the determination in step S51.

As described above, the compression method is altered if the file full occurs (YES in step S24). Accordingly, image data of one original is compressed and stored in the file buffer M2.

On the other hand, if NO in step S41a or YES in step S54, whether the page buffer M1 is to be kept held is checked (942).

If YES in step S42 and in the case of low-speed ADF, the ADF is driven to discharge the last page, and the current capacity of the file buffer M2 is informed (S55). Thereafter, a status indicating that the input task is "memory full", "resources not released", and "being interrupted" is set in the state of the input task of one of the tables (FIG. 9) corresponding to the current job ID (S56), and the flow advances to the processing starting from step S47.

Low-speed ADF is the convey method by which, as shown in steps S21 to S23 in FIG. 13, one original page is conveyed to the original table 2 by driving the ADF, image data of this original page is read by the scanner 313, the image data is temporarily stored in the page buffer M1 (S22), and then the image data is compressed into a file and stored in the file buffer M2 (S23). On the other hand, high-speed ADF (to be described later) is the convey method in which, as will be described later with reference to FIG. 26, one original page is conveyed to the original table 2 by driving the ADF, image data of this original page is read by the scanner 313, and the ADF is again driven to discharge the original page from the original table 2 and at the same time convey the next original page from the original supply table 22 to the original table 2.

If NO in step S42 described above in the high-speed ADF case, the ADF is driven to discharge the original placed on the original table 2 via the paper delivery roller 48. The input page counter fpc is incremented by "1", and the content of the input page counter as fpcback (=fpc+1) is saved in the state of the input task of one of the tables (FIG. 9) corresponding to the current job ID (S43). That is, the data finally read into the page buffer M1 and neither compressed nor stored in the file buffer M2 is saved as an address to be stored next. Thereafter, the flow advances to the processing in step S54a described previously.

The input restart processing executed when YES is determined in step S50 or S51 will be described below with reference to FIG. 15.

Referring to FIG. 15, a file status corresponding to the job ID is retrieved from the states of an input task, and the content of the input page counter saved as fpcback in the state of that input task is reset to fpc (S60).

Furthermore, the status upon input interrupt is retrieved from the states of that input task (S61).

Subsequently, it is checked from the status whether interrupt has occurred after the input resources are released (S62). If NO in step S62, i.e., if YES in step S42 described earlier, image data of one original page held in the page buffer M1 is again compressed and stored in the file buffer M2. The flow then advances to step S24 described previously to check whether "file full has occurred" (S24).

If YES in step S62, processing for reserving the input resources (e.g., the page buffer M1 and the scanner) again is performed (S64).

Whether the last page when the file full occurred is compressed and filed in the file buffer M2 is checked (S65). If YES in step S65, i.e., if YES in step S41a described earlier and therefore the compression method is changed, this means that filing is completed. Accordingly, the flow advances to the processing starting from step S18 described above to thereby accept the next original.

If NO in step S65, a message is displayed on the operation panel 114 to instruct the user to again input the last input page when the file full occurred (S66).

Thereafter, whether the start key is depressed is checked (S67). If YES in step S67, the flow advances to the processing starting from step S18. As an example, if NO is determined in step S42 and the page buffer M1 is released, to input the last page again, the user need only depress the start key. If ADF input is set (S19), the ADF is driven, image data of one original page is input again (S22), and this image data is compressed and stored in the area of the file buffer designated by fpcback (S23).

If NO in step S67, whether a termination instruction is issued is checked (S68). If YES in step S68, the flow advances to the processing starting from step S32 in FIG. 14. That is, the file buffer M2 is deleted, the current capacity of the file buffer M2 is informed (S33), and the flow returns to step S13.

If NO in step S68, the determination in step S67 is executed again.

The output processing performed in step S30 of FIG. 13 will be described below with reference to FIGS. 16A, 16B and 17. First, whether the copy management task A issues a print start instruction (i.e., YES in step S5 of FIG. 8B) is checked (S71). If YES in step S71, the contents of the job are retrieved from the tables shown in FIG. 9 by using the job as a key (S72).

Processing of reserving the printing resources is executed.

It is then checked whether the output side set as the print contents of the corresponding job contents indicates "double-side" and a group mode or a sort mode is set (S74).

Figure 28A:
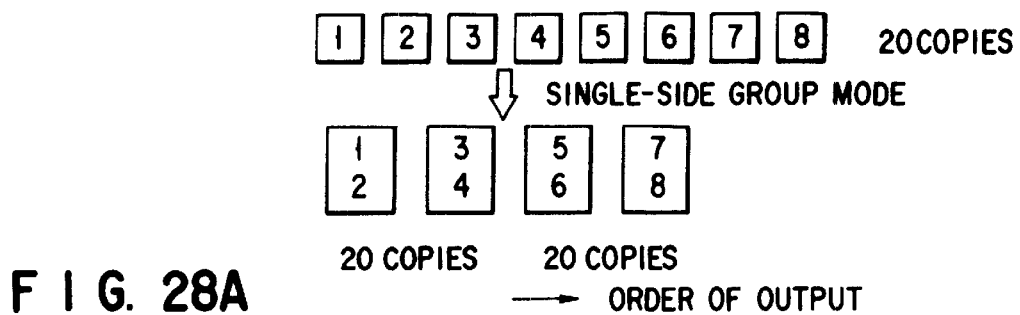
FIG. 28A is a view for explaining a single-side group mode.

A group mode will be described below by taking image synthesis (so-called 2 in 1) shown in FIG. 28A as an example. Referring to FIG. 28A, to output twenty copies of each of eight original pages from page 1 to page 8 in the group mode, pages 1 and 2 are synthesized and twenty copies of the synthetic result are output first. Subsequently, pages 3 and 4 are synthesized and twenty copies of the synthetic result are output. In this order, the desired number of copies, i.e., twenty copies, of each synthetic result are output.

Figure 28B:
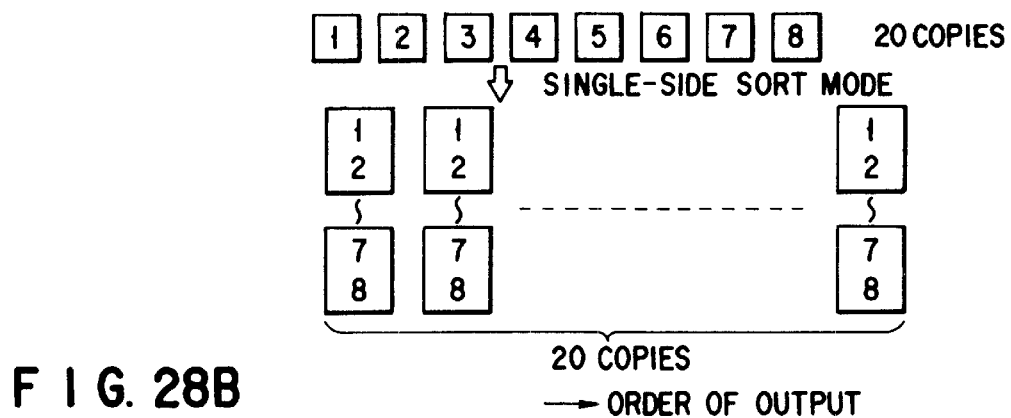
FIG. 28B is a view for explaining a single-side sort mode.

A sort mode will be described below by taking image synthesis (so-called 2 in 1) shown in FIG. 28B as an example. Referring to FIG. 28B, to output twenty copies of each of original pages from page 1 to page 8, pages 1 and 2, pages 3 and 4, pages 5 and 6, and pages 7 and 8 are synthesized, and one copy of each synthetic result is output. This copying/output processing is repeated the desired number of times, i.e., twenty times.

Figure 28C:
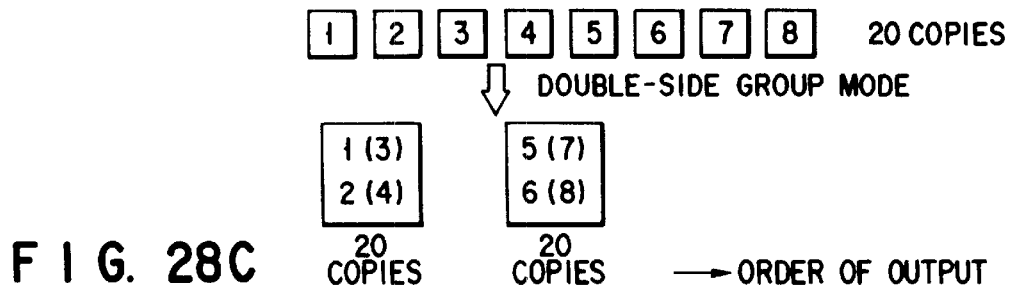
FIG. 28C is a view for explaining a double-side group mode.
Figure 28D:
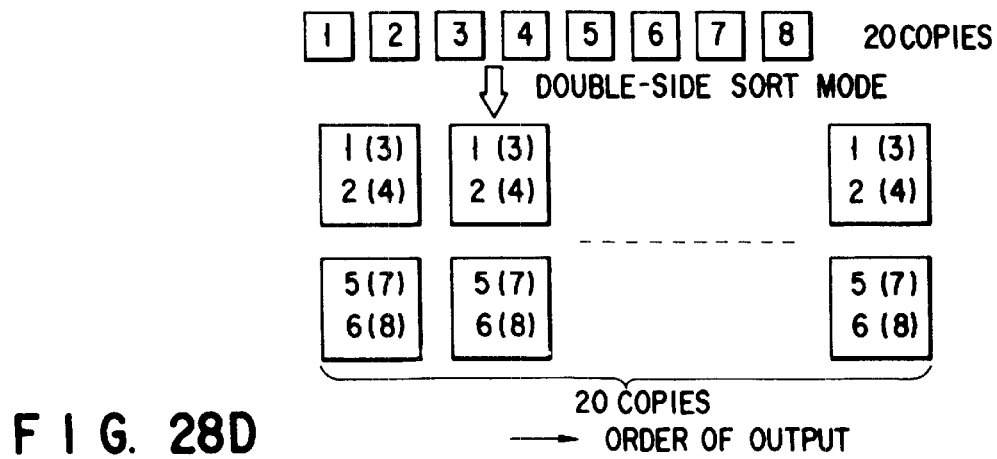
FIG. 28D is a view for explaining a double-side sort mode.

FIG. 28C illustrates a group mode in the case of double-side copying. FIG. 28D shows a sort mode in the double-side copying case. Referring to FIGS. 28C and 28D, pages 1 and 2 are synthesized and the synthetic image is formed on the upper surface of a copy sheet, pages 3 and 4 are synthesized and the synthetic image is formed on the lower surface of the same copy sheet, and the resultant copy sheet is output.

Figure 20:
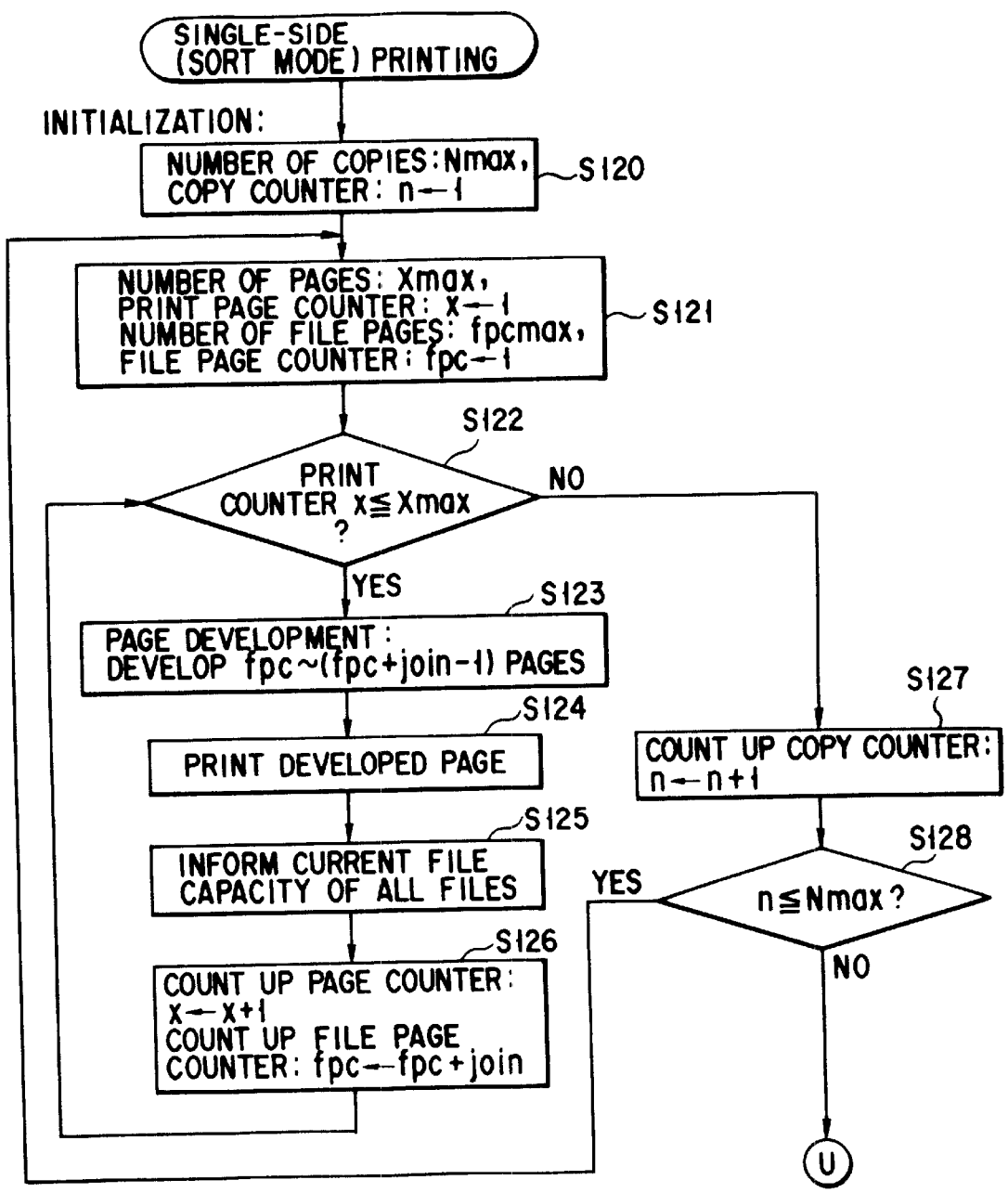
FIG. 20 is a flow chart for explaining single-side printing (sort mode)
Figure 21:
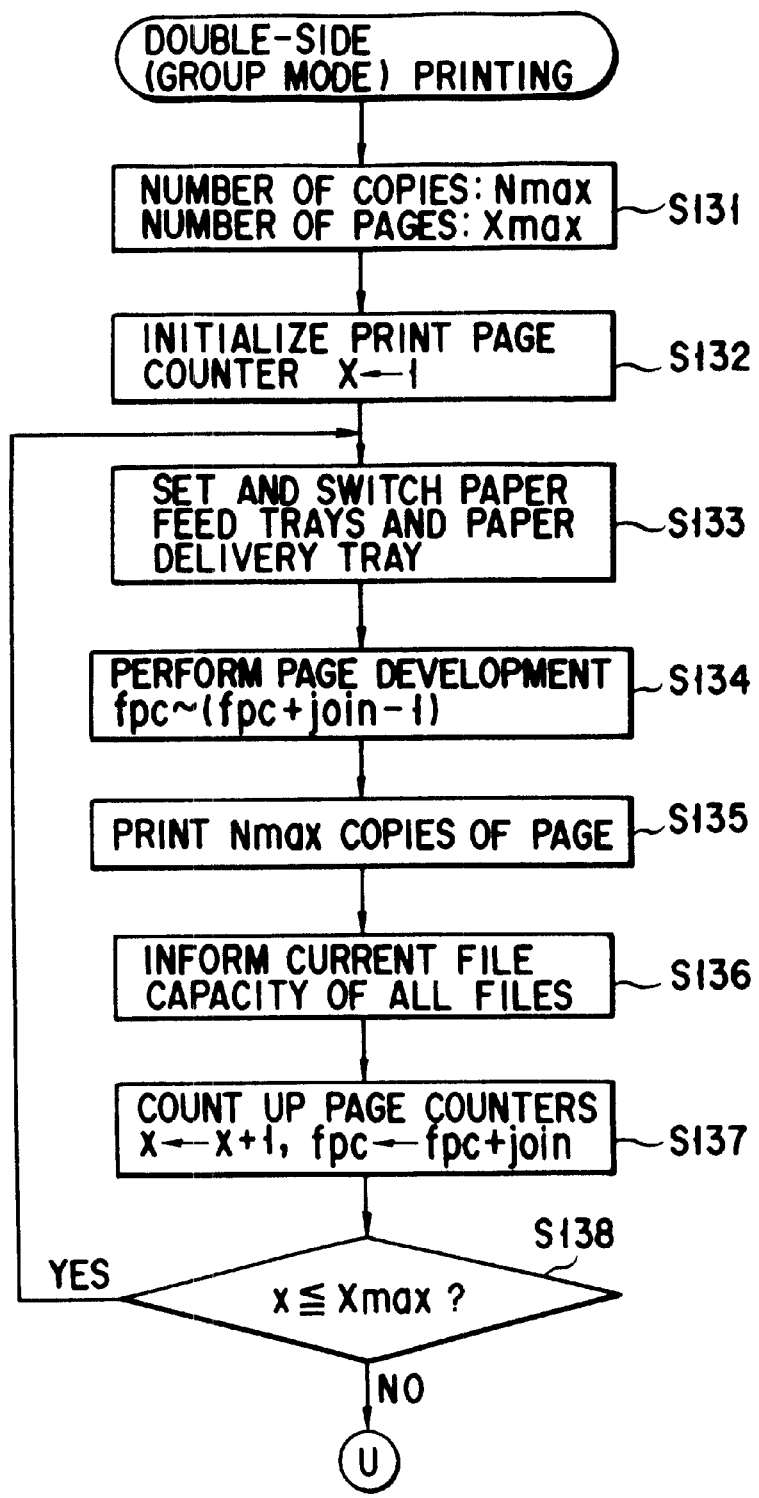
FIG. 21 is a flow chart for explaining double-side printing (group mode)

If "single-side printing, group mode" is determined in step S74, single-side printing (group mode) to be described later with reference to FIG. 19 is executed (S75). If "single-side printing, sort mode" is determined in step S74, single-side printing (sort mode) to be described later with reference to FIG. 20 is executed (S76). If "double-side printing, group mode" is determined in step S74, double-side printing (group mode) to be described later with reference to FIG. 21 is executed (S77). If "double-side printing, sort mode" is determined in step S74, double-side printing (sort mode) to be described later with reference to FIG. 22 is executed (S78).

After the printing is completed, the printing resources (the page buffer M1 and the printer 315) are released (S79).

The status of the input job is retrieved from the tables shown in FIG. 9 by using the job ID as a key, and the state of the input task corresponding to that job is retrieved (S80).

Whether the input task holds "being interrupted" and "memory full" is checked (S81). "Being interrupted" and "memory full" are set in steps S46 and S56 described previously.

If NO in step S81, i.e., if "single-side printing" is determined in step S81, whether there is a page in which the number of joined pages does not reach the designated number of pages to be joined is checked (S83). If YES in step S83, file pages except for file pages to be joined on the corresponding printing page are deleted (S84).

Figure 12:
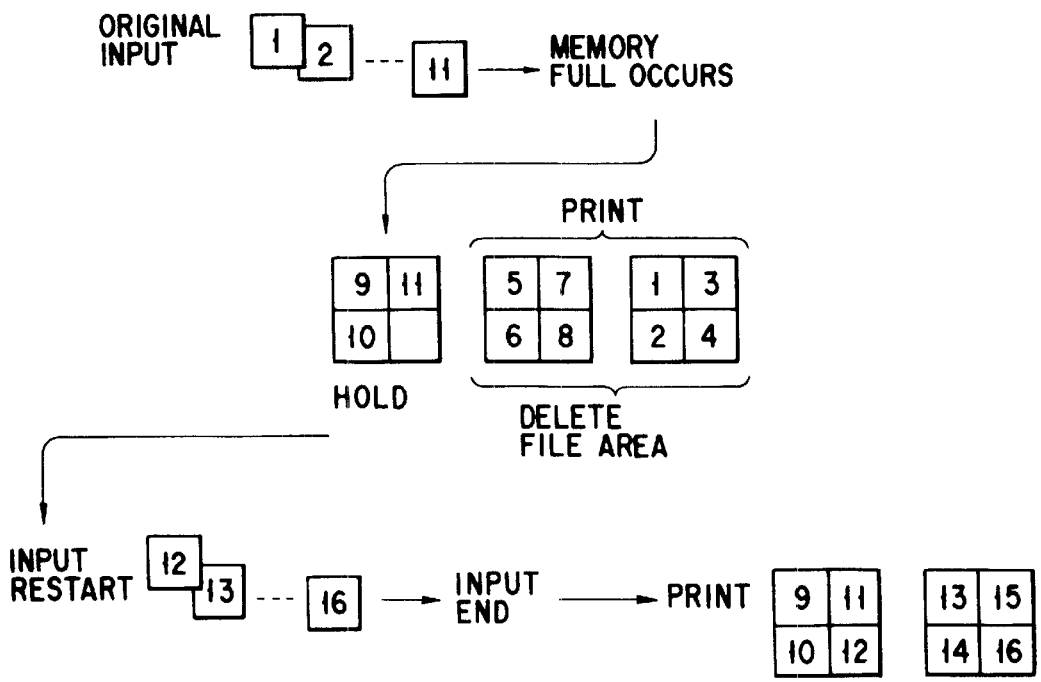
FIG. 12 is a view for explaining an operation if the memory full occurs when joined pages are present.

For example, when four originals are to be reduced and printed on one side of a sheet, pages 1 to 10 are stored in the file buffer M2 as illustrated in FIG. 12. If the file full occurs when page 11 is stored, pages 1 to 8 are deleted from the file buffer M2. Unprinted pages 9 to 11 are kept held without being deleted.

If NO in step S83, all areas of the file buffer M2 are deleted (S85).

If YES in step S82 (double-side printing), whether there is a page to be subjected to single-side printing is checked (S86). If YES in step S86, file pages except for file pages to be joined or synthesized on the page subjected to single-side printing are deleted (S87).

If NO in step S87, whether there is a page in which the number of joined pages does not reach the designated number of pages to be joined is checked (S88). If NO in step S88, the processing in step S85 described above is executed to delete all the pages from the entire file buffer M2.

If YES in step S98, file pages except for those to be joined on the corresponding printing page are deleted (S89).

The processing in step S87 is executed if there is a page to be subjected to single-side printing while "double-side printing" is designated. In this case, it is determined that the file full has occurred when an original corresponding to the other side of the page is compressed in the file buffer M2. Accordingly, file pages except for those to be joined or synthesized on the joined page or the page subjected to single-side printing are deleted.

The processing in step S89 is executed when, for example, pages 1 and 2 are to be printed on the upper surface and pages 3 and 4 are to be printed on the lower surface, and if "file full" occurs in storing data of page 4 into the file buffer M2. In this case, file pages except for data of three pages, i.e., pages 1, 2, and 3, are deleted.

After steps S84, S85, S87, and S89, the currently storage file capacity of all files is informed (S100). The status of the print job (FIG. 9) in the RAM 104 is updated by the print task, and the copy management task A is informed that memory-full printing is completed (S101). The flow then returns to the determination in step S71.

If NO in step S81 described above, all areas of the file buffer M2 are deleted (S91), and the current file capacity of all files is informed (S92). Additionally, print job end processing is performed, i.e., "no job" is set in the status (S93). The flow then advances to the determination in step S13 of FIG. 13.

As described above, when the file buffer becomes full while originals are being input page by page, the print processing is executed to delete the file buffer, and then the originals are compressed and stored.

Figure 11:
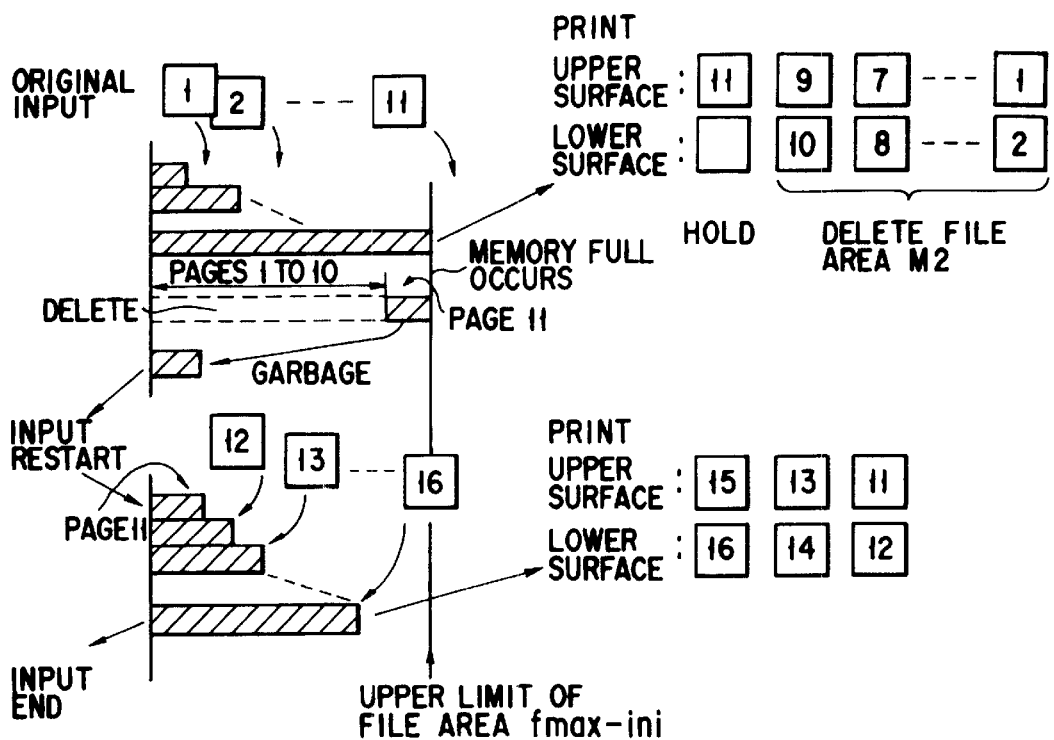
FIG. 11 is a view for explaining a method of controlling the file buffer M2 if the memory full occurs when joined pages are present.

When two original s are to be printed on the upper and lower surfaces of a sheet in double-side printing as shown in FIG. 11, pages 1 to 11 are read by the scanner and input to the file buffer M2. If the file full occurs while page 12 is being stored, pages 1 to 11 are printed beforehand. In this case, page 11 of the document is kept stored after being printed so that double-side printing is normally performed even when page 12 and the subsequent pages are successively input.

Single-side printing (group) will be described below with reference to FIG. 19. First, the counter is initialized (S110). The contents of initialization are file page counter fpc←1, print page counter x←1, number of pages: xmax, number of copies: Nmax, number of joined file pages for one printing page: join, and number of file pages: fpcmax. If no pages are to be joined, join=1 is set.

Subsequently, whether print counter x≦xmax, i.e., whether printing is completed is checked (S111). If YES in step S111, page development is performed (S112). That is, fpc→(fpc+join−1) pages, i.e., one page is expanded and developed in the print buffer (S112).

Nmax copies of the page developed in the print buffer are printed by the printer 315 (S113).

Whether the printed page is released is checked (S114). If YES in step S114, data of fpc→(fpc+join−1) pages, i.e., data of one page is deleted from the file buffer M2 (S115).

After step S115 or if NO is determined in step S114, the current file capacity of all files in the file buffer M2 is informed (S116).

Thereafter, print page counter x←x+1 and file page counter fpc←fpc+join are set (S116), and the flow returns to step S111. In a similar fashion, Nmax copies of page 2 and the subsequent pages are printed by the processing in step S112 and S113.

When each of all the pages is printed by Nmax, YES is determined in step S111, and the flow returns to step S79 in FIG. 16.

The print processing in single-side printing (group mode) is performed as described above. That is, Nmax copies are printed from page 1, and each time printing of one page is completed, the area of one page is deleted from the file buffer M2.

Single-side printing (sort mode) will be described below with reference to FIG. 20. Number of copies: Nmax and copy counter n←1 are set as initialization (S120).

Subsequently, number of pages: xmax, print page counter x←1, number of file pages: fpcmax, and file page counter fpc←1 are set.

Whether print counter x≦xmax, i.e., whether printing is completed is checked (S122). If YES in step S122, page development is performed (S123). That is, fpc→(fpc+join−1) pages are obtained, i.e., one page stored in the file buffer M2 is expanded and developed in the print buffer (S123).

The page developed in the print buffer is printed by the printer 315 (S124).

The current file capacity of all files in the page memory 323 is informed (S125).

Print page counter x←x+1 and file page counter fpc←fpc+join are set (S126), and the flow returns to step S122. After pages 2 to xmax are similarly printed one by one, YES is determined in step S122, and copy counter n←n+1 is set (S127).

Subsequently, whether copy counter n≦Nmax is checked (S128). If YES in step S128, the flow returns to the processing in step S121 described above. When pages 1 to xmax are printed in the processing in step S123 and S124, YES is determined in step S122, and the copy counter n is counted up (S127).

When Nmax copies of each of pages 1 to xmax are completely printed, NO is determined in step S128, and the flow returns to the processing in step S79 of FIG. 16.

In this way, printing of Nmax copies of each of pages 1 to xmax is completed.

Double-side printing (group mode) will be described below with reference to the flow chart in FIG. 21. First, number of copies: Nmax and number of pages: xmax are attained as initialization (S131). Then print counter x←1 is set (S132).

Paper feed trays and a paper delivery tray are set and switched (S133). That is, in double-side printing, printing is first performed on the lower surface of each sheet, Nmax copied sheets are stored, and printing is performed on the upper surfaces of the Nmax copies. More specifically, printing is performed on the lower surface of a sheet fed from the paper feed cassette 30, and the sheet is delivered to the ADD 73b. The sheet having the printed lower surface is fed from the ADD 73b, printing is performed on the upper surface of the sheet, and the sheet is delivered to the paper delivery tray 74. The paper feed cassettes 30 and the paper delivery tray 74 are so switched as to realize this print processing.

Page development is then performed (S134). That is, fpc→(fpc+join−1) pages are obtained, i.e., one page stored in the file buffer M2 is expanded and developed in the print buffer.

Figures 23, 24:
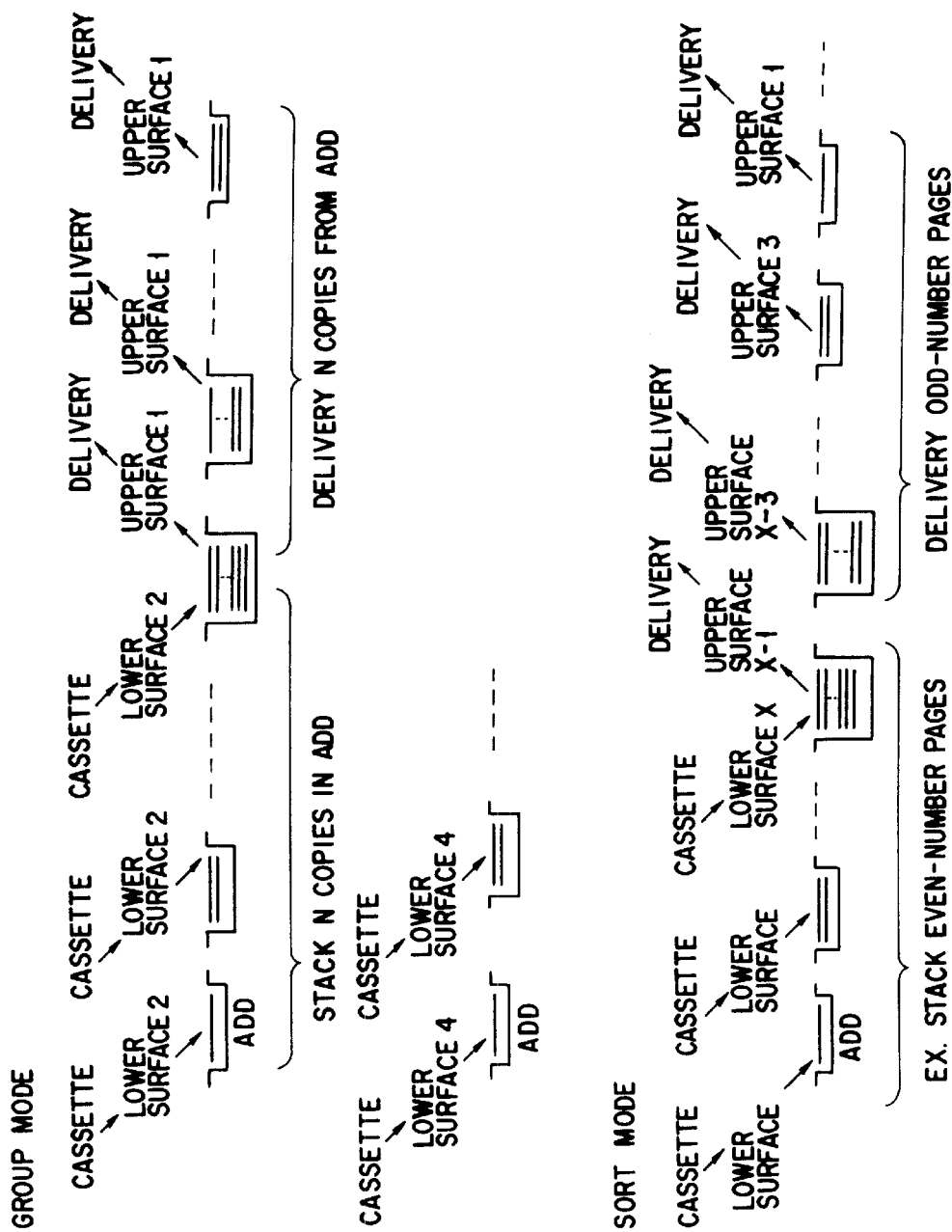
FIG. 23 is a view for explaining the flow of a paper sheet in the double-side printing (group mode)
FIG. 24 is a view for explaining the flow of a paper sheet in the double-side printing (sort mode)

Nmax copies of the page developed in the print buffer are printed by the printer 315 (S135). That is, in the group mode, as illustrated in FIG. 23, printing is first performed only on the lower surfaces of sheets from the cassette, and N printed sheets are stacked in the ADD. These sheets are then picked up one by one from the ADD, and printing is performed on the upper surfaces of the sheets. Thereafter, the current file capacity of all files in the page memory 323 is informed (S136).

Subsequently, print page counter x←x+1 and file page counter fpc←fpc+join are set (S137).

Whether print counter x≦xmax, i.e., whether printing is completed is checked (S138). If YES in step S138, the processing starting from step S133 is repeatedly executed, and Nmax copies of each of pages 2 to xmax are printed on both the sides. When all pages are completely printed on both the sides, YES is determined in step S138, and the flow returns to the processing in step S79 of FIG. 16.

Double-side printing (sort mode) will be described below with reference to FIG. 22.

First, number of copies: Nmax and copy counter n←1 are set as initialization (S141), and number of pages: xmax, print page counter: x←1, and file page counter fpc are initialized for each of the upper and lower surfaces. For example, since pages 2, 4, . . . , are printed on the lower surfaces, file page counter fpc←2 is set. On the other hand, pages 1, 3, . . . , are printed on the upper surfaces in the reverse order. Therefore, if the maximum odd number of file pages, i.e., the number of file pages fpcmax is an even number, file page counter fpc←(fpcmax−1) is set (S142).

Subsequently, the paper feed trays and the paper delivery tray are set (S143). After printing is performed on the lower surface of a sheet fed from the paper feed cassette 30, the sheet is delivered to the ADD 73b. The sheet having the printed back side is fed from the ADD 73b, printing is performed on the upper surface of the sheet, and the sheet is delivered to the paper delivery tray 74. The paper feed cassettes 30 and the paper delivery tray 74 are so switched as to realize this print processing.

Page development is then performed (S144). That is, fpc→(fpc+join−1) pages in the case of lower-surface printing, and fpc→(fpc+join+1) pages in the case of front-side printing, stored in the file buffer M2, i.e., one page is expanded and developed in the print buffer.

The page developed in the print buffer is printed by the printer 315 (S145). That is, in the sort mode, as illustrated in FIG. 24, X originals are first sequentially printed only on the lower surfaces (page 2, page 4, page 6, . . . , page X) of sheets. Printing is then performed on the upper surfaces (page X−1, page X−3, . . . , page 1) of these sheets, and the resultant sheets are output.

The current file capacity of all files in the file buffer M2 is informed (S145). Print page counter x←x+1 is then set (S146).

Subsequently, whether print counter x≦xmax, i.e., whether printing is completed is checked (S147). If YES in step S147, the file page counter is set such that fpc←fpc+(join×2) in the lower-surface printing or fpc←fpc−(join×2) in the upper-surface printing, and the processing starting from step S144 is executed. When pages up to page xmax are printed by double-side printing, NO is determined in step S147, and copy counter n←n+1 is set (S149).

Whether number of copies n≦2Nmax is then checked (S150). If YES in step S150, the flow returns to the processing in step S142 described previously, i.e., printing of the second and subsequent copies is performed. In double-side (sort mode) printing, lower-surface printing is done when the copy counter n indicates an odd number, and upper-surface printing is done when the copy counter n indicates an even number. Accordingly, in step S142 the file page counter fpc and the paper feed and delivery trays are reset by using the value of the copy counter as a key.

When printing is completed, NO is determined in step S150, and the flow returns to the processing in step S79 of FIG. 16.

The double-side printing (sort mode) is completed in this way.

In the above embodiment, the original input task is performed as described previously with reference to the flow charts in FIGS. 13 to 15. That is, one original page is placed on the original table 2 by ADF driving (S21) or manually. Image data of this original page is read from the scanner 313 and temporarily stored in the page buffer M1 (S22). The image data is then compressed into a file and stored in the file buffer M2 (S23). In this manner, after one original page is filed in the file buffer M2, ADF driving (S21) is performed to file the next original page. Accordingly, filing of original pages takes some time because the ADF is driven to convey each subsequent original page to the original table 2 before the original is filed.

Figure 25:
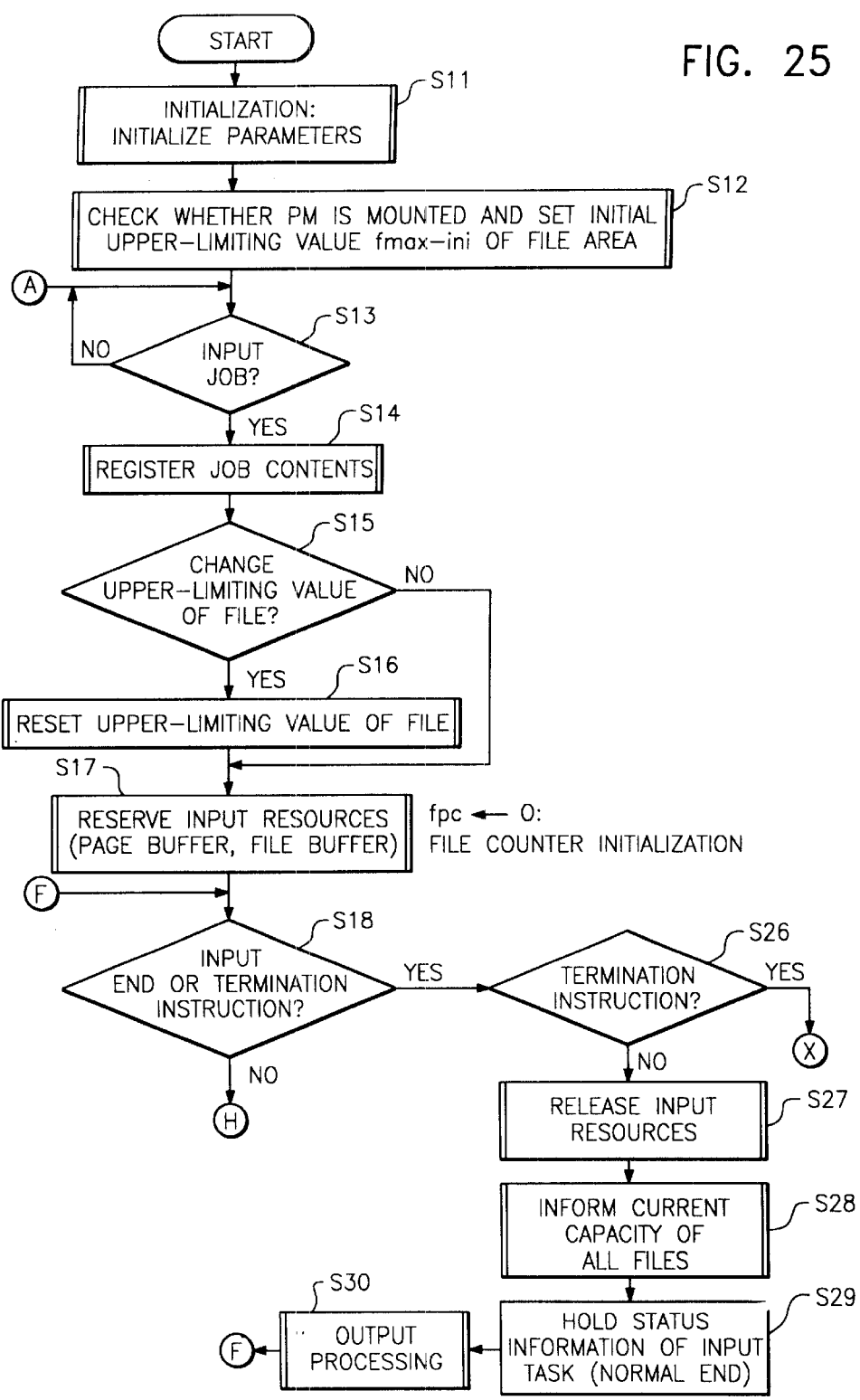
FIG. 25 is a part of a flow chart for explaining a modification of the original input task.
Figure 26:
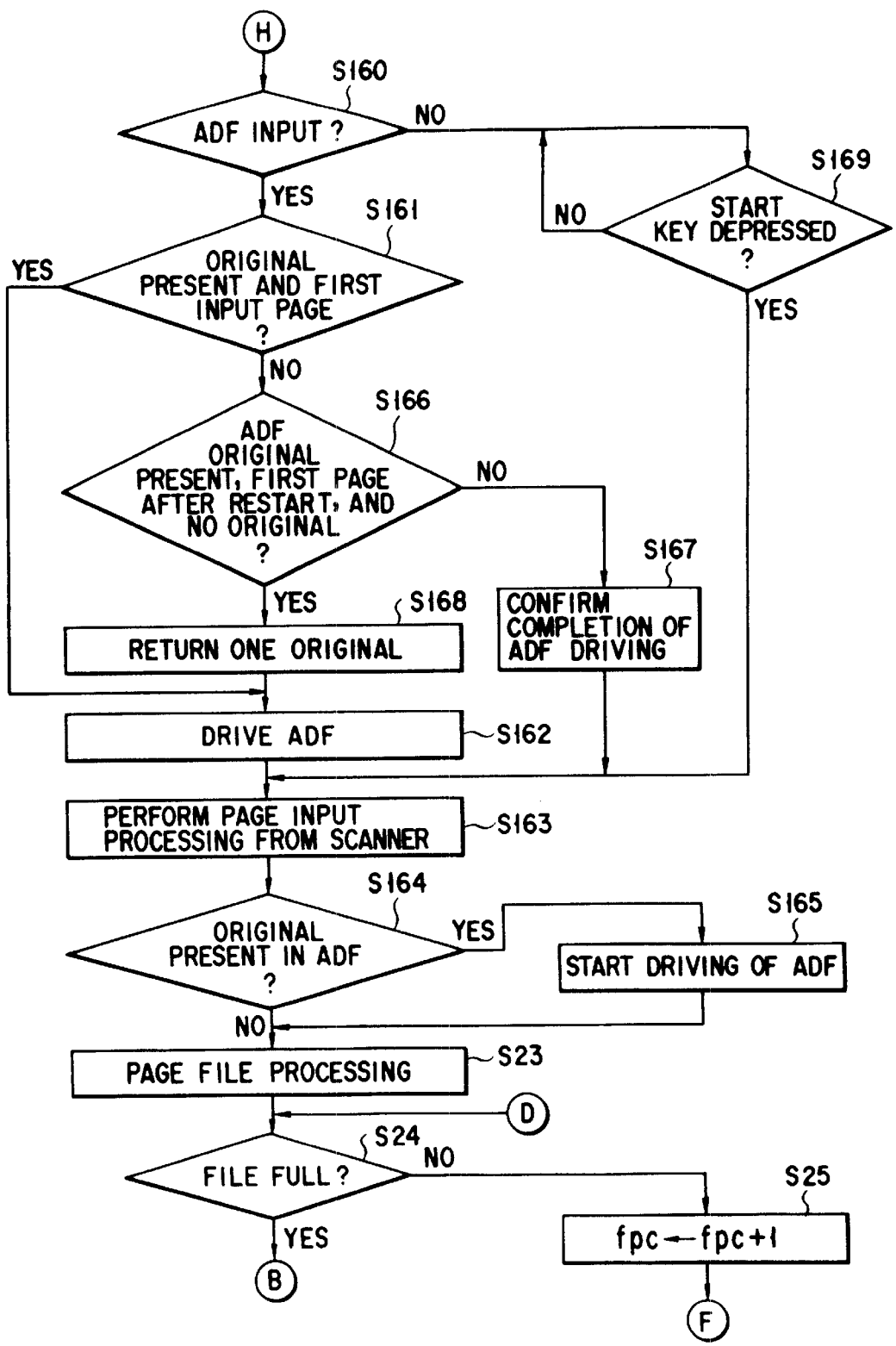
FIG. 26 is a part of a flow chart for explaining the modification of the original input task.

FIGS. 25 and 26 are flow charts for explaining a modification in which the speed of input of an original done by ADF driving is increased. FIGS. 25 and 26 correspond to the flow chart (FIG. 13) which shows the operation of the original input task in the above embodiment. The original input task is completed in FIGS. 25 and 26 and FIGS. 14 and 15.

To increase the speed at which an original is input by ADF driving, image data of one original page is read from the scanner 313 and temporarily stored in the page buffer M1. The ADF is then driven to discharge the original page whose image data is already acquired from the original table 2 and convey one original page held on the original supply table 22 to the original table 2. Thereafter, the image data temporarily stored in the page buffer M1 is compressed into a file and stored in the file buffer M2.

Details of the operation of the original input task will be described below with reference to FIGS. 25 and 26. The processing operations in steps S11 to S18 of FIG. 25 are the same as those in steps S11 to S18 of FIG. 13.

In step S18, whether an input end or termination instruction is entered from the operation panel 114 is checked. If NO in step 518, whether ADF input is present is checked (S160).

The operation when ADF driving is performed will be described below. In this case, YES is determined in step S160, so whether an ADF original is present and is the first input page is checked (S161). The presence/absence of an ADF original is checked by detecting whether an original page is held on the original supply table 22 by using an optical means. Whether the original page is the first input page is checked by checking whether the input page counter fpc is "0".

If YES in step S161, the ADF is driven to convey one original page held on the original supply table 22 to the original table 2 (S162).

Image data of one original page read from the scanner 313 is temporarily stored in the page buffer M1, thereby performing page input processing (S163).

After this page input processing, whether an ADF original is still present on the original supply table 22 is checked (Sl64).

If YES in step S164, the ADF is again driven to discharge the original placed on the original table 2 and convey one original page held on the original supply table 22 to the original table 2 (S165). After the next original is conveyed to the original table 2 in this way, an end flag is set.

If NO in step S164 or after the processing in step S165, the image data of one original page temporarily stored in the page buffer M1 is compressed by the compressing/expanding means 324 and stored in the file buffer M2 (S23).

Subsequently, whether the file buffer M2 becomes full is checked (S24). More specifically, it is checked whether the upper-limiting value fpc-max of the file buffer M2 is exceeded if the image data of one original page compressed by the compressing/expanding means 324 is stored in the file buffer M2.

If YES in step S24, the flow advances to the processing starting from step S41 (FIG. 14) as described previously.

If NO in step S24, the input page counter fpc is incremented by "1" (S25), and the flow returns to step S18.

Accordingly, NO is determined in step S18, and whether there is ADF input is checked (S160).

YES is determined in step S160 since there is ADF input, so the determination in step S161 is again executed. In this case, NO is determined in step S161 because the input page counter fpc is incremented by "1" in step S25 described above. Therefore, it is checked whether an ADF original is present and is the first page after restart and no original is on the original table (S166).

The "first page after restart" has the following meaning. That is, when the file full (i.e., the file buffer M2 becomes full) is determined in step S24 described above, a file full countermeasure is performed following the procedure shown in the flow charts of FIGS. 14 and 15. The file full determination is performed again in step S24, and NO is determined. Accordingly, the input page counter fpc is incremented by "1" in step S25, and the flow returns to step S18. The "first page after restart" means the first original input next.

"No original" means that there is no original on the original table 2.

If the ADF is normally driven, the next original has been conveyed to the original table 2 by the processing in step S165 d e scribed earlier. Consequently, an original is placed on the original table 2. Therefore, NO is determined in step S166, and completion of ADF driving is confirmed (S167). That is, it is confirmed that the end flag is set. Thereafter, the processing operations in steps S163, S164, S165, S23, S24, and S25 are repetitively executed. That is, the original pages held on the original supply table 22 are picked up one by one and set on the original table 2 by ADF driving, and image data of one original page read by the scanner 313 is temporarily stored in the page buffer M1, thereby performing the page input processing (S163). After the next original is picked up from the original supply table 22 and set on the original table 2 (S165), the image data of the original temporarily stored in the page buffer M1 is compressed by the compressing/expanding means 324 and stored in the file buffer M2 (S23).

On the other hand, if YES is determined in step S166, e.g., if no original is conveyed to the original table 2 due to an error which has occurred when ADF driving is performed last in step S165, only one original page that has been already discharged is returned to the original supply table 22 (S168). The ADF is then driven (S162), and the flow advances to the processing in step S163.

If NO is determined in step S160 described above, whether the start key is depressed is checked (S169). If YES in step S169, the processing starting from step S163 is repeated.

As described above, if there is an original on the original table 2 after the memory full has occurred, YES is determined in step S166, and the flow advances to step S167. The page input processing is performed by the scanner, and if there is an ADF original, the ADF reads the next original (S165). This makes it possible to automatically restart ADF driving after the memory full is canceled.

According to the present invention, as has been described in detail above, it is possible to provide a composite image forming apparatus which is an image forming apparatus for storing a plurality of originals by compressing them and which can accurately perform a copying operation even if a memory for storing the compressed originals becomes full.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image forming apparatus comprising:

means for storing an image of a plurality of originals given from an exterior as one document, means for setting an N in one (the N being an integer) print mode by combining image data of the N number of originals to be printed out on a single output medium;

means for detecting that the storing means is full during a process of storing the plurality of originals performed by the storing means;

means for, regardless of a user's instruction, automatically selecting the image data as long as the image data of an integral multiple of the N number of originals sufficient to form an image on a single output medium are stored even though not all of the image data of the one document is stored when the setting means sets the N in one print mode and the detecting means detects that the storing means is full;

N in one image forming means for, by using the N in one print mode, forming an image of a part of the originals instead of images of all of the originals to be received by storing means as one document based on the image data selected by the selecting means;

means for deleting the printed image data from the storing means when printing is performed by the N in one printing means; and means for holding image data of the originals whose image formation is not completed and whose number is fewer than the N number sufficient for forming an image on a single output medium in the storing means without performing an image formation.

2. An image forming apparatus comprising:

means for reading an image of a plurality of originals;

means for storing the image of the plurality of originals read by the reading means as one document;

means for setting an N in one (the N being an integer) print mode by combining image data of the N number of originals to be printed out on a single output medium;

means for detecting that the storing means is full during a process of storing the plurality of originals performed by the storing means;

means for, regardless of a user's instruction, automatically selecting the image data as long as the image data of an integral multiple of the N number of originals sufficient to form an image on a single output medium an stored even though not all of the image data of the one document is stored when the setting means sets the N in one print mode and the detecting means detects that the storing means is full;

N in one image forming means for, by using the N in one print mode, forming an image of a part of the originals instead of originals of images of all the originals to be received by the storing means as one document based on the image data selected by the selecting means;

means for deleting the printed image data from the storing means when printing is performed by the N in one printing means; and means for holding image data of the originals whose image formation is not completed and whose number is fewer than the N number sufficient for forming an image on a single output medium in the storing means without performing an image formation.

3. An image forming apparatus comprising:

first compressing means for compressing image data of an original by a first compression method;

first storing means for storing the image data compressed by the first compressing means;

first detecting means for detecting that the first storing means is full of the image data;

second compressing means for compressing the image data in the first storing means by a compression method different from the first compression method when the first detecting means detects that the first storing means is full;

second storing means for storing the image data compressed by the second compressing means;

second detecting means for detecting that the second storing means is full of the image data;

sorting means for, when the second detecting means detects that the second storing means is full, obtaining a greatest multiple of a number of pages containable in a single image forming medium, the greatest multiple not exceeding a number of the originals stored in the second storing means into a first image group having the number of the images equal to the multiple and a second image group having a remaining number of the images;

first controlling means for performing control to delete the first image group from the second storing means after forming images from the first image group by means of the sorting means and delete the second image group from the second storing means; and second controlling means for, when the second detecting means detects that the second storing means is full and regardless of whether there are originals still to be stored, forming a necessary number of sets of images from portions of the stored image as long as a same printed image as the stored image can be obtained, and after image formation, deleting portions of the stored image not required for a subsequent image formation, thereby retaining in the second storing means only portions of the stored image necessary when forming an image corresponding to an image or originals subsequently input and stored as a same document as the already used portions of the stored image.

* * * * *